US008164786B2

(12) United States Patent
Watanabe

(10) Patent No.: US 8,164,786 B2
(45) Date of Patent: Apr. 24, 2012

(54) PRINT DATA GENERATING APPARATUS AND COMPUTER USABLE MEDIUM THEREFOR, AND IMAGE PROCESSING APPARATUS AND COMPUTER USABLE MEDIUM THEREFOR

(75) Inventor: Takeshi Watanabe, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 974 days.

(21) Appl. No.: 11/723,129

(22) Filed: Mar. 16, 2007

(65) Prior Publication Data
US 2007/0216924 A1 Sep. 20, 2007

(30) Foreign Application Priority Data

Mar. 20, 2006 (JP) ................. 2006-077723

(51) Int. Cl.
*G06K 1/00* (2006.01)
*G06K 15/00* (2006.01)
(52) U.S. Cl. ........ 358/1.9; 358/1.16; 358/1.2; 358/1.14; 399/54
(58) Field of Classification Search ................... 358/1.9, 358/500, 518, 515, 1.16, 1.2, 1.14; 399/28, 399/45, 53, 54; 347/14, 15, 43, 98
See application file for complete search history.

(56) References Cited

U.S. PATENT DOCUMENTS

| | | | |
|---|---|---|---|
| 6,206,504 B1 * | 3/2001 | Payne | 347/43 |
| 7,652,794 B2 * | 1/2010 | Lee | 358/3.26 |
| 7,952,754 B2 * | 5/2011 | Watanabe | 358/1.9 |

FOREIGN PATENT DOCUMENTS

| | | |
|---|---|---|
| JP | A-63-212268 | 9/1988 |
| JP | A 06-237374 | 8/1994 |
| JP | A-09-046508 | 2/1997 |
| JP | A-2000-134457 | 5/2000 |
| JP | A 2000-163238 | 6/2000 |
| JP | A 2000-272174 | 10/2000 |
| JP | A-2002-046303 | 2/2002 |

OTHER PUBLICATIONS

Office Action issued in JP Application No. 2007-069966 on Jun. 28, 2011 (with English translation).

* cited by examiner

*Primary Examiner* — King Poon
*Assistant Examiner* — Lawrence Wills
(74) *Attorney, Agent, or Firm* — Oliff & Berridge, PLC

(57) ABSTRACT

A print data generating apparatus to generate print data used for printing in a printing apparatus based on image data representing an image to be printed on a recording medium is provided. The print data generating apparatus comprises a data inputting system, by which application color setting data is inputted in the print data generating apparatus, a color substituting system, in which color information of each of the pixels configuring the image data is substituted with color information of an application color to print each of the pixels configuring the image data based on the application color setting data, and a print data generating system, in which print data to be used for printing is generated based on the image data wherein the color information of each of the pixels is substituted with the color information of the application color in the color substituting system.

21 Claims, 14 Drawing Sheets

410

| COLOR CONVERSION TABLE ||| ||||
|---|---|---|---|---|---|---|
| sRGB VALUE ||| CMYK VALUE ||||
| R | G | B | C | M | Y | K |
| 0 | 0 | 0 | 0 | 0 | 0 | 0 |
| 64 | 0 | 0 | 0 | 32 | 45 | 0 |
| 128 | 0 | 0 | 0 | 101 | 123 | 0 |
| 192 | 0 | 0 | 0 | 190 | 210 | 0 |
| 255 | 0 | 0 | 0 | 255 | 250 | 0 |
| 0 | 64 | 0 | 50 | 23 | 10 | 10 |
| 64 | 64 | 0 | 100 | 32 | 45 | 35 |
| 128 | 64 | 0 | 80 | 62 | 70 | 55 |
| 192 | 64 | 0 | 20 | 102 | 190 | 15 |
| 255 | 64 | 0 | 0 | 180 | 250 | 0 |
| ... | ... | ... | ... | ... | ... | ... |
| 0 | 192 | 255 | 255 | 20 | 0 | 0 |
| 64 | 192 | 255 | 190 | 21 | 0 | 0 |
| 128 | 192 | 255 | 128 | 31 | 0 | 0 |
| 192 | 192 | 255 | 54 | 25 | 0 | 0 |
| 255 | 192 | 255 | 0 | 20 | 0 | 0 |
| 0 | 255 | 255 | 255 | 10 | 0 | 0 |
| 64 | 255 | 255 | 198 | 2 | 0 | 0 |
| 128 | 255 | 255 | 130 | 0 | 0 | 0 |
| 192 | 255 | 255 | 55 | 0 | 0 | 0 |
| 255 | 255 | 255 | 0 | 0 | 0 | 0 |

| WHITE CONVERSION TABLE ||||
|---|---|---|---|
| sRGB VALUE ||| WHITE CONVERSION TABLE |
| R | G | B | W VALUE |
| 0 | 0 | 0 | 0 |
| 64 | 0 | 0 | 30 |
| 128 | 0 | 0 | 100 |
| 192 | 0 | 0 | 150 |
| 255 | 0 | 0 | 255 |
| 0 | 64 | 0 | 32 |
| 64 | 64 | 0 | 120 |
| 128 | 64 | 0 | 145 |
| 192 | 64 | 0 | 180 |
| 255 | 64 | 0 | 255 |
| ... | ... | ... | ... |
| 0 | 192 | 255 | 250 |
| 64 | 192 | 255 | 251 |
| 128 | 192 | 255 | 253 |
| 192 | 192 | 255 | 254 |
| 255 | 192 | 255 | 255 |
| 0 | 255 | 255 | 255 |
| 64 | 255 | 255 | 251 |
| 128 | 255 | 255 | 245 |
| 192 | 255 | 255 | 250 |
| 255 | 255 | 255 | 255 |

| SPECIFIC COLOR CONVERSION TABLE | | | |
|---|---|---|---|
| SPECIFIC COLOR | R | G | B |
| 1 | 225 | 0 | 0 |
| 2 | 100 | 100 | 100 |
| 3 | 225 | 255 | 0 |
| 4 | 0 | 100 | 255 |
| 5 | 240 | 240 | 240 |

PRINT DATA GENERATING APPARATUS AND COMPUTER USABLE MEDIUM THEREFOR, AND IMAGE PROCESSING APPARATUS AND COMPUTER USABLE MEDIUM THEREFOR

CROSS REFERENCE TO RELATED APPLICATION

This application claims priority from Japanese Patent Application No. 2006-077723, filed on Mar. 20, 2006, the entire subject matter of which is incorporated herein by reference.

BACKGROUND

1. Technical Field

Aspects of the present invention relate to a print data generating apparatus and print data generating programs therefore, and image processing apparatus and image processing programs therefor capable of generating print data which is used for printing in the printing apparatus, and more specifically, capable of generating print data suitable for printing each of pixels of an image in a desired color in the printing apparatus.

2. Related Art

Conventionally, in an inkjet printing apparatus that performs recording by ejecting inks onto a recording medium, the inks are ejected from ejecting nozzles, which are provided at an end of ink channels, by leading the inks from ink reservoirs to a plurality of ejecting channels in inkjet heads, and by selectively activating actuators (e.g., heating elements, piezoelectric elements, and the like). When an image is formed in colors, each of pixels composing the image is resolved, for example, into the three primary colors, which are cyan (C), magenta (M), and yellow (Y), then a colored pixel is formed as the inks adjusted in their densities are ejected onto the recording medium. Also, a pixel which contains black as a component is generally reproduced as a black (K) ink is ejected onto the recording medium. Further, in recent years, a printing apparatus wherein a white (W) ink is used in order to achieve an image with high reproducibility on the recording medium, when a ground color of the recording medium is a color other than white, is known.

Also conventionally, various techniques designed for processing a background color of an image during the time of image printing are known. An example of such techniques is disclosed in Japanese Patent Provisional Publication No. H 6-237374 (hereinafter referred to as "'374 publication"). In a picture processing unit in '374 publication, when a print control key is pressed and an image received therein is displayed in a display section, the image with its background color extracted is displayed. When an instruction for executing a printing operation is given, the image without the background color is printed. With this process, an unnecessary background color is prevented from being printed so that consumption of ink is decreased.

For another example, an overlay printing processing method is disclosed in Japanese Patent Provisional Publication No. 2000-163238 (hereinafter referred to as "'238 publication"). In this method, a binary raster image is dynamically produced as mask data based on shape data of the print data. Logical AND of each color component of the raster image data for overlaying and the mask data is obtained, and logical OR of the data undergoing the logical AND with the mask data and each color component of the raster image of the print data is obtained. Thus, accurately overlaid reverse character and diagram which has a same color as the background can be achieved.

Further, an example of a color printer, wherein a paper is colored in an arbitrary color without preparing a color paper, is disclosed in Japanese Patent Provisional Publication 2000-272174 (hereinafter referred to as "'174 publication"). In this color printer, a background color is designated through an operation panel or a command from a host PC (personal computer) so that print data is transmitted to the color printer from the host PC. Thereafter, frame memory corresponding to one page of the paper is prepared in a controller, and an operation to fill the frame memory with the designated background color is executed. Further, developed print data is overwritten in the frame memory.

When a recording medium with its color being other than white (e.g. yellow) is used, a user may create image data having a background area of which color is represented in yellow in consideration of printing the image on yellow as a ground color. In this regard, the yellow background area in the printed image may be printed in one of three patterns, which are "printing in a transparent color (i.e., no printing is performed)", "printing in white", and "printing in yellow". Further, when a color of the recording medium is blue, and the user creates image data having a background area of which color is represented in yellow, the yellow background area in the printed image may be printed in one of four patterns, which are "printing in a transparent color (i.e., no printing is performed)", "printing in white", "printing in yellow", and "printing in blue".

Thus, in general, the background area may be printed in one of three patterns, which are "printing in the color represented by the image data as it is", "printing in a transparent color", and "printing in a specific color instead of the color represented by the image data". Conventionally, however, the user has not been allowed to arbitrarily designate the printing pattern of the background color. Therefore, for example, when the user intends to print the background area, of which color is represented in yellow in the image data, in a specific color (for example, blue), the user has been required to execute an editing operation on the image data by substituting yellow as the background color into blue, and creating the print data based on the edited image data.

According to the picture processing unit disclosed in '374 publication and the image processing method disclosed in '238 patent, the user can arbitrarily designate colors and areas to be printed in the transparent color, and according to the color printer in '174 publication, the white color in the white area in the image data can be replaced into another color. Even with these techniques, however, the user are not allowed to arbitrarily designate one of the three patterns to print the background area in the image printing operation, nor to designate a plurality of the background colors so that each of the background colors can be respectively set.

Meanwhile, a plurality of pixels that configure the image data, which are other than the pixels in areas other than the background area, can also be printed in one of the three patterns, which are "printing in the color represented by the image data as it is", "printing in the transparent color", and "printing in a specific color instead of the color represented by the image data". Therefore, the pixels in the areas other than the background area contain the similar problems regarding the data generation to the pixels in the background area. That is, the user is required to edit the image data so that the pixels in the image can be printed in a desired color when the desired color to be printed is different from a color of the pixels displayed on a display device.

In addition, in some cases the user may wish to process one area in one solid color displayed on the display device to be divided into smaller areas so that each area can be printed on a recording medium in different colors. For example, it may be desired that a part of a background area displayed in yellow should be printed in the transparent color while the remaining part of the background area should be printed in blue. In such cases, conventionally, the user has been required to perform operations to edit the pixels and the smaller areas respectively.

However, such operations are often complicated and troublesome, and various mistakes may occur during the operation. Therefore, it has been difficult for the user to achieve a desired printed image on the recording medium. It should be noted that a solution to solve the above problems so that one solid color in one area in the image data is printed in different colors partially or on a pixel basis is found in any of the inventions disclosed in the above '374, '238, and '174 patents.

SUMMARY

Aspects of the present invention are advantageous in that a print data generating apparatus and a print data generating program therefor, wherein the user can arbitrarily designate a background color of an image to be printed and a pattern to process the background color so that print data to print the background color in a desired manner on a recording medium can be created, are provided.

BRIEF DESCRIPTION OF THE ACCOMPANYING DRAWINGS

FIG. 7 shows a data configuration of a color conversion table 410 according to the embodiment of the invention.

FIG. 8 shows a data configuration of a white conversion table 420 according to the embodiment of the invention.

DETAILED DESCRIPTION

General Overview

Figure 1:
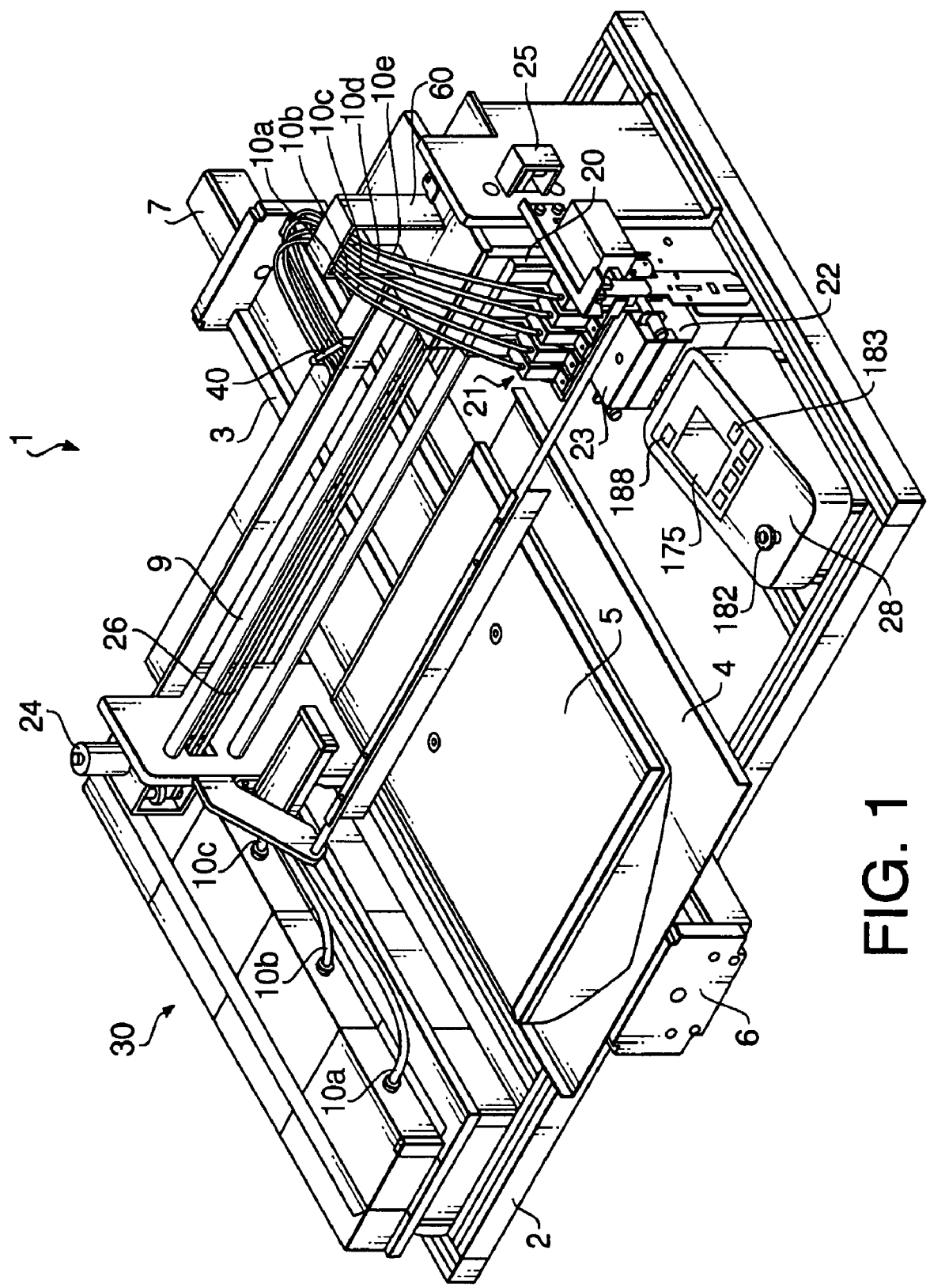
FIG. 1 is a perspective view of an overall configuration of an inkjet printer 1 according to an embodiment of the invention.

According to an aspect of the present invention, a print data generating apparatus to generate print data which is used for printing in a printing apparatus based on image data representing an image to be printed on a recording medium is provided. The print data generating apparatus comprises a data inputting system, by which application color setting data, wherein application colors to print each of pixels configuring the image data are indicated on a pixel basis, is inputted in the print data generating apparatus, a color substituting system, in which color information of each of the pixels configuring the image data is substituted with color information of the application color to print each of the pixels configuring the image data based on the application color setting data, and a print data generating system, in which print data to be used for printing is generated based on the image data wherein the color information of each of the pixels is substituted with the color information of the application color in the color substituting system.

According to the above configuration, as the application color setting data wherein the application colors to print each of pixels configuring the image data are indicated on a pixel basis, is inputted, the color information of the pixel configuring the image data is substituted with the color information of the corresponding application color based on the application color setting data so that the print data is generated based on the image data wherein the color information is substituted. Therefore, the print data can be generated so that the image can be printed in an appearance on the recording medium as the user desires.

Optionally, the application color setting data may be assigned one color pattern as the application color to print each of the pixels configuring the image data among a plurality of application color patterns including a pixel color, a transparent color, and a specific color.

According to the above configuration, as the print data is generated based on the application color setting data, the pixel configuring the image data can be printed in an arbitrary appearance as desired by the user according to the application color pattern such as in the "pixel color", the "transparent color", and the "specific color" specified by the user.

Optionally, the color substituting system may maintain the color information of the pixel configuring the image data unsubstituted when the pixel is assigned the pixel color as the application color pattern.

According to the above configuration, as the application color setting data is assigned the "pixel color" as the application color pattern, the pixel having the color information corresponding to the application color pattern can be printed in the color of the original pixel.

Optionally, the color substituting system may substitute the color information of the pixel configuring the image data with color information whereby no printing is executed when the pixel is assigned the transparent color as the application color pattern.

According to the above configuration, as the application color setting data is assigned the "transparent color" as the application color pattern, the pixel having the color information corresponding to the application pattern can be prevented from being printed.

Optionally, the color substituting system may substitute the color information of the pixel configuring the image data with color information of a specific color when the pixel is assigned the specific color as the application color pattern.

According to the above configuration, as the application color setting data is assigned the "specific color" as the application color pattern, the pixel having the color information corresponding to the application pattern can be printed in the specific color.

Optionally, the specific color as the application pattern assigned to the application color setting data may be one of a plurality of predetermined specific colors, which respectively correspond to different colors. The color substituting system may substitute the color information of the pixel configuring the image data with color information of one of the different colors as the specific color.

According to the above configuration, as the application color setting data is assigned the predetermined "specific color" as the application color pattern, the pixel having the color information corresponding to the application pattern can be printed in the predetermined color.

Optionally, the plurality of predetermined specific colors may include white.

According to the above configuration, as the application color setting data is assigned white as the "specific color", the pixel having the color information corresponding to the application pattern can be printed in white so that an image with higher reproducibility can be obtained even when a color of the recording medium is a color other than white.

Optionally, the print data generating apparatus may comprise a specific color table storing system, in which a specific color table defining correspondences between the predetermined specific colors and the different colors is stored. The color substituting system may specify color information of one of the different colors as the specific color and substitutes the color information of the pixel configuring the image data with the color information of the specified color information of the specific color when the application color setting data is assigned the specific color as the application color to print one of the pixels configuring the image data.

According to the above configuration, with the specific color table wherein the correspondence between the specific colors and the different colors are defined, the application color setting data is not required to include the color information of the different colors so that a volume of the application color setting data can be reduced. Further, the user can easily designate one of the specific colors, and the correspondence between the specific colors and the different colors can be arbitrarily edited by the user According to another aspect of the invention, a computer usable medium comprising computer readable instructions for controlling a computer is provided. The computer readable instructions control the computer to generate print data which is used for printing in a printing apparatus based on image data representing an image to be printed on a recording medium by executing steps of inputting application color setting data, wherein application colors to print each of pixels configuring the image data are indicated on a pixel basis, in a print data generating apparatus, substituting color information of each of the pixels configuring the image data with color information of the application color to print each of the pixels configuring the image data based on the application color setting data, and generating print data to be used for printing based on the image data wherein the color information of each of the pixels is substituted with the color information of the application color in the color substituting system.

According to the above configuration, the user can arbitrarily specify the application color to print the pixel configuring the image data, and the print data can be generated so that the image can be printed in an appearance on the recording medium as the user desires.

According to another aspect of the invention, an image processing apparatus capable of generating application color setting data, wherein application colors to print each of pixels configuring image data of an image to be printed on a recording medium are indicated on a pixel basis, is provided. The image processing apparatus comprises an image data inputting system, by which the image data is inputted in the image processing apparatus, a background color designating system, in which at least one background color of a pixel in a background area of the image to be printed is arbitrarily designated based on a feature of the recording medium, an application color designating system, in which one application color pattern is designated among a plurality of application color patterns including a pixel color, a transparent color, and a specific color as the application color to print the at least one background color of the pixel, and an application color setting data generating system, in which the application color setting data is generated based on the at least one background of the pixel designated in the background color designating system and the application color pattern designated in the application color designating system.

According to the above configuration, the application color setting data wherein the application colors are assigned on a pixel basis of the image data can be generated by designating the background color and the application color for the color of the pixel in the image data.

According to another aspect of the invention, an image processing apparatus capable of generating application color setting data, wherein application colors to print each of pixels configuring image data of an image to be printed on a recording medium are indicated on a pixel basis, is provided. The image processing apparatus comprises an image data inputting system, by which the image data is inputted in the image processing apparatus, a background pixel position designating system, in which at least one position of a pixel in a background area of the image to be printed is arbitrarily designated, an application color designating system, in which one application color pattern is designated among a plurality of application color patterns including a pixel color, a transparent color, and a specific color as the application color to print the pixel in the background area in the at least one position, and an application color setting data generating system, in which the application color setting data is generated based on the position of the pixel in the background area in the at least one position designated in the background pixel position designating system and the application color pattern designated in the application color designating system.

According to the above configuration, the application color setting data wherein the application colors are assigned on a pixel basis of the image data can be generated by designating the position of the pixel and the application color for the color of the pixel in the image data.

According to another aspect of the invention, a computer usable medium comprising computer readable instructions for controlling a computer is provided. The computer readable instructions control the computer to generate application color setting data, wherein application colors to print each of pixels configuring image data of an image to be printed on a recording medium are indicated on a pixel basis, by executing steps of inputting the image data in the computer, designating arbitrarily at least one background color of a pixel in a background area of the image to be printed based on a feature of the recording medium, designating one application color pattern among a plurality of application color patterns including a pixel color, a transparent color, and a specific color as the application color to print the at least one background color of the pixel, and generating the application color setting data based on the at least one background of the pixel designated in the background color designating system and the application color pattern designated in the application color designating system.

According to the above configuration, the application color setting data wherein the application colors are assigned on a pixel basis of the image data can be generated by designating the background color and the application color for the color of the pixel in the image data.

According to another aspect of the invention, a computer usable medium comprising computer readable instructions for controlling a computer is provided. The computer readable instructions control the computer to generate application color setting data, wherein application colors to print each of pixels configuring image data of an image to be printed on a recording medium are indicated on a pixel basis, by executing steps of inputting the image data in the computer, designating arbitrarily at least one position of a pixel in a background area of the image to be printed, designating one application color pattern among a plurality of application color patterns including a pixel color, a transparent color, and a specific color as the application color to print the pixel in the background area in the at least one position; and generating the application color setting data based on the position of the pixel in the background area in the at least one position designated in the background pixel position designating system and the application color pattern designated in the application color designating system.

According to the above configuration, the application color setting data wherein the application colors are assigned on a pixel basis of the image data can be generated by designating the position of the pixel and the application color for the color of the pixel in the image data.

According to another aspect of the invention, a print data generating apparatus to generate print data which is used for printing in a printing apparatus based on original image data representing an image to be printed on a recording medium is provided. The print data generating apparatus comprises a data inputting system, by which application color setting data, wherein application colors to print each of pixels configuring the original image data are indicated on a pixel basis, is inputted in the print data generating apparatus, an application information specifying system, in which at least one of color information and positional information of one of the pixels configuring the original image data and a pattern to print the pixel are specified, an application information data generating system, wherein application information data that includes information indicating the pattern to print the one of the pixels configuring the original image data is generated, and a print data generating system, in which the print data to be used for printing each of the pixels configuring the original image data is generated based on the image data and the application information data generated in the application information data generating system.

Embodiment

Hereinafter, referring to accompanying drawings, a first embodiment of the present invention will be described. In the present embodiment, a known personal computer 200 (see FIG. 3), which is connected to a known inkjet printer 1 (see FIGS. 1 and 2) for fabric, generates print data for printing in the inkjet printer 1.

As shown in FIG. 1, the inkjet printer 1 includes a substantially box-shaped chassis 2 with two rails 3 aligned in parallel with a front-rear direction as indicated by an arrow at an approximate center of a bottom surface thereof. The rails 3 are supported by bases (not shown) which are positioned perpendicularly with respect to the bottom surface of the chassis 2. The rails 3 support a plate as a platen base (not shown) which is movable in the front-rear direction of the chassis along the rails 3. Further, the platen base is provided with a platen mount (not shown) that extends perpendicularly with respect to the platen base at a substantial center of the platen base. An exchangeable platen 5 is set on top of the platen mount.

The platen 5 is a substantially rectangular-shaped plate and detachably attached to the platen mount with longer sides thereof aligned in parallel with the front-rear direction of the chassis 2, and clothing fabric as a recording medium is placed on the platen 5. In a position between the platen 5 and the platen base is provided a tray 4, which is fixed to the platen mount, so that a remaining part of the fabric other than the area to be printed such as sleeves of the T-shirt is received thereby and prevented from hanging over the bottom surface of the chassis 2 when the T-shirt is set on the platen 5. A platen drive mechanism 6 includes the rails 3, along which the platen base is carried in the front-rear direction of the chassis 2 by a platen drive motor 7, as the platen motor 7 is provided at a rear end of the platen drive mechanism 6.

At an approximate center of the chassis 2 in the front-rear direction, above the platen 5, a guide rail 9 to guide a carriage 20 with an inkjet head 21 mounted is provided. In vicinity of a left-hand end of the guide rail 9, a carriage motor 24 to drive the carriage 20 is provided, while a pulley 25 is provided in vicinity of a right-hand end of the guide rail 9. Further, a carriage belt 26 is drawn between the carriage motor 24 and the pulley 25 under the guide rail 9. The carriage belt 26 is fixed to a rear surface of the carriage 20 so that the carriage 20 is reciprocated along the guide rail 9 when the carriage motor 24 is activated.

In the inkjet printer 1 according to the present embodiment, white ink, in addition to cyan ink, magenta ink, yellow ink, and black ink, is used for image printing. Therefore, five ink cartridge storage units 30, wherein ink cartridges having the inks therein are detachably attached, are provided on the left-hand side of the inkjet printer 1, and black ink, cyan ink, magenta ink, yellow ink, and white ink are contained in the ink cartridges respectively.

Each ink cartridge storage unit 30 is connected to each of the inkjet heads 21 by ink supplying tubes 10a-10e so that the inks of the five colors stored in the ink cartridges are supplied to each channel of the inkjet heads 21 passing under a guiding member 40 and a tube supporting member 60. The ink supplying tubes 10a-10e are flexible tubes which can be bent and twisted to a certain extent according to the movement of the carriage 20. The guiding member 40 holds the ink supplying tubes 10a-10e behind the carriage 20. The tube supporting member 60 holds the ink supplying tubes 10a-10e as well is provided at an upper surface of the carriage 20.

The carriage 20 is provided with the five piezoelectric inkjet heads 21. Each inkjet head 21 is provided with a plurality of (for example, 128) ejection channels (not shown)

through which the ink is conveyed. Each of the channels is provided with a piezoelectric actuator (not shown), which is activated individually, to eject an ink drop downward onto the recording medium from ejection nozzles (not shown) that are open at a nozzle surface of the inkjet head 21. Thus, the inks stored in the ink cartridge storage units 30 are supplied to the inkjet heads 21 through the ink supplying tubes 10a-10e and ejected from the ejection nozzles.

At a position corresponding to the carriage 20 being carried to the right-hand end of the guide rail 9, a purge unit 22 with a suction cap 23, which can be closely attached to and separated from the nozzle surfaces. The purge unit 22 is provided with a suction pump (not shown) so that the inks remaining in the ejection nozzles can be removed therefrom when the suction cap 23 is attached to the nozzle surfaces. Further, when the inkjet printer 1 is not in a printing operation, the nozzle surfaces are covered by the suction cap 23 so that the inks in the nozzle surfaces can be prevented from being dried.

At right-hand front of the chassis 2 is provided an operation panel 28 to which the user inputs an instruction for the inkjet printer 1. The operation panel 28 includes a display 175, a print button 182, a cancel button 183, and a platen feed button 188. As the platen feed button 188 is pressed, the platen 5 is moved to a position wherein the fabric such as a T-shirt as a recording medium can be set on and removed from the platen 5. When the print button 182 is pressed by the user, a printing operation to print the print data received from the personal computer 200 is started. When the cancel button 183 is pressed during the printing operation, the printing operation is canceled.

Figure 2:
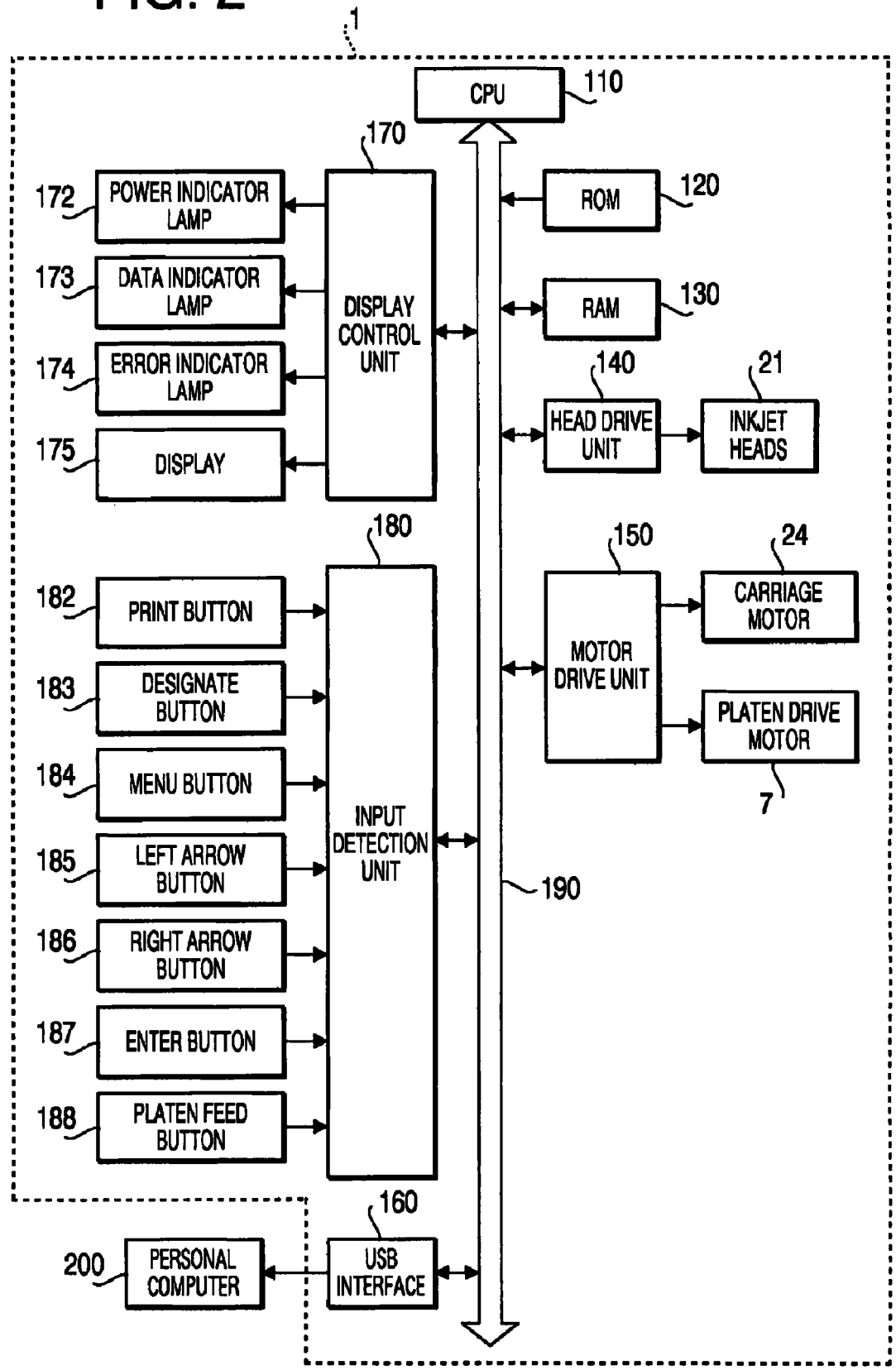
FIG. 2 is a block diagram of an electrical configuration of the inkjet printer 1 according to the embodiment of the invention.

Next, referring to FIG. 2, an electrical configuration of the inkjet printer 1 will be described. FIG. 2 is a block diagram showing the electrical configuration of the inkjet printer 1 according to the present embodiment of the invention. As shown in FIG. 2, the inkjet printer 1 is provided with a CPU 110 that controls the entire operation in the inkjet printer 1. The CPU 110 is connected with a ROM 120, wherein various information to be used in control programs executed by the CPU 110 is stored, and a RAM 130, wherein various information is temporally stored via a bus 190.

The CPU 110 is further connected with a head drive unit 140, which activates the piezoelectric actuators being provided to each channel of the inkjet head 21 and a motor drive unit 150, which controls a carriage motor 24 and a platen drive motor 7. The carriage motor 24 drives the carriage 20 having the inkjet heads 21, and the platen drive motor 7 drives a platen roller (not shown), which adjusts timing and speed to feed the platen 5 holding the fabric as a recording medium. The CPU 110 is further connected to a USB interface 160, which allows communication between the inkjet printer 1 and external devices including the personal computer 200 through a USB cable (not shown).

The operation panel 28 (see FIG. 1) is provided with the display 175, a power indicator lamp 172, a data indicator lamp 173, and an error indicator lamp 174. A display control unit 170 which executes displaying processes of these indicators is connected to the CPU 110 through the bus 190. Further, the operation panel 28 is provided with a menu button 184, a left arrow button 185, a right arrow button 186, and an Enter button 187, in addition to the print button 182, the cancel button 183, and the platen movement button 188 (see FIG. 1). An input detection unit 180 which executes detecting of these inputs is connected to the CPU 110 through the bus 190.

On the display 175, information regarding the print data such as a name and a size of the data being received from the personal computer 200 is displayed as the CPU 110 is in one of various states such as a receiving state, a print ready state, a printing state, and a print completion state, for example. Also, a menu screen (not shown) to prompt the user's input regarding various settings and details of an error when an error occurs, are displayed on the display 175. When the menu button 184 is pressed, the menu screen is displayed on the display 175, and a cursor shown on the display 175 is moved in left and right as the left arrow button 185 and the right arrow button 186 are pressed. Upon pressing the Enter button 187, an item being selected by the cursor is entered.

The ROM 120 in the inkjet printer 1 is provided with several areas including a program storing area for storing programs such as a control program for controlling an operation of the inkjet printer 1 and a print execution program for executing a printing process, and a program-related information storing area for storing information regarding settings, initial values, and data being necessary for executing the programs.

The RAM 130 in the inkjet printer 1 is provided with several areas including a received print data storing area for storing the print data received from the personal computer 200, an in-printing data storing area for storing the print data being printed, and a setting information storing area for storing various setting information.

Figure 3:
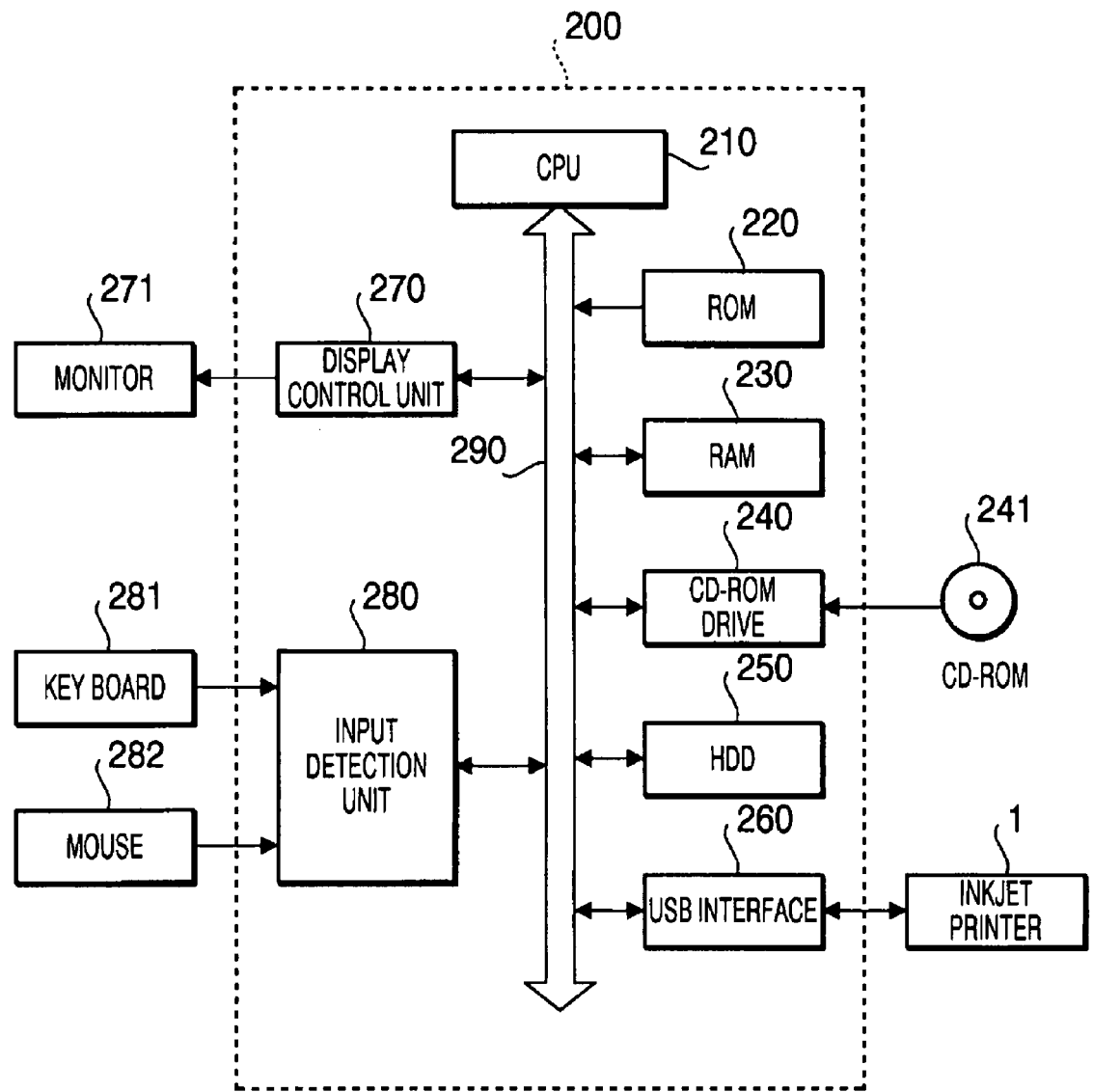
FIG. 3 is a block diagram of an electrical configuration of a personal computer 200 according to the embodiment of the invention.
Figure 4:
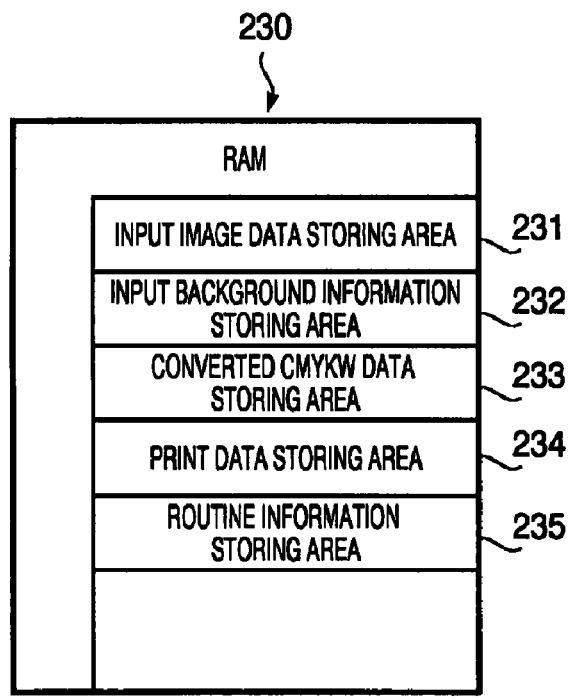
FIG. 4 is a schematic diagram of a RAM 230 in the personal computer 200 according to the embodiment of the invention.
Figure 5:
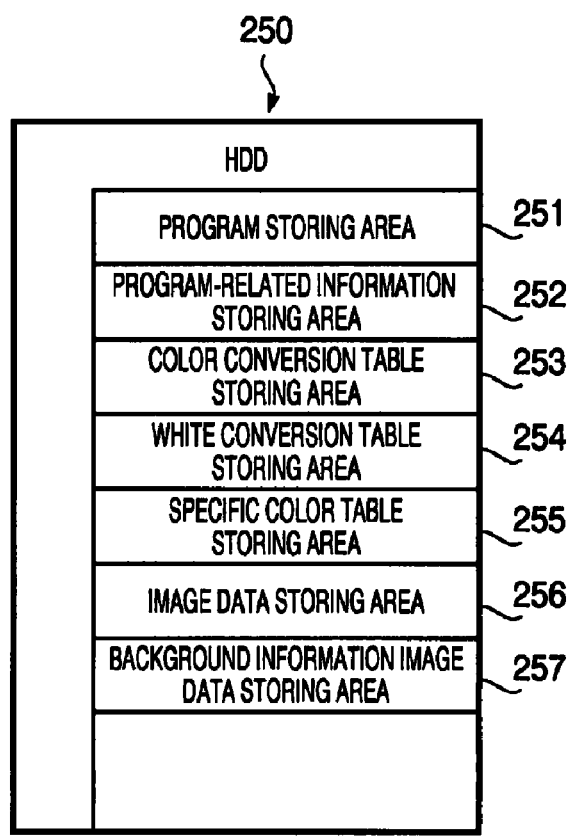
FIG. 5 is a schematic diagram of an HDD (hard disk drive) 250 in the personal computer 200 according to the embodiment of the invention.

Next, a configuration of the personal computer 200 will be described. FIG. 3 is a block diagram of an electrical configuration of the personal computer 200 according to the present embodiment of the invention. FIG. 4 is a schematic diagram of a RAM 230 in the personal computer 200 according to the present embodiment of the invention. FIG. 5 is a schematic diagram of an HDD 250 in the personal computer 200 according to the present embodiment of the invention. The personal computer 200 is connected to the inkjet printer 1 through a standardized communication cable, for example a USB. In the personal computer 200, print data is generated based on image data created by the user using various applications, and the print data is transmitted to the inkjet printer 1. A process to create the print data will be described in detail hereinafter.

As shown in FIG. 3, the personal computer 200 is provided with a CPU 210 that controls the entire operation in the personal computer 200. The CPU 210 is connected with a ROM 220, wherein various information to be used in controlling programs executed by the CPU 210 is stored, and a RAM 230, wherein various information is temporarily stored via a bus 290. Further, a CD-ROM drive 240 for reading data from a CD-ROM 241 inserted therein as a storage medium of data, and the HDD 250 which is a storage unit for data, through a bus 290, are connected to the CPU 210.

The CPU 210 is further connected to a USB interface 260, which allows communication between the personal computer 200 and external devices including the inkjet printer 1 through a USB cable (not shown). The CPU 210 is furthermore connected to a display control unit 270 which executes displaying processes to display an operation screen, input devices including a keyboard 281 and a mouse 282 which are operated by the user, and an input detection unit 280 which executes detecting of these inputs. It should be noted that the personal computer 200 is also provided with other units such as a Floppy® disk drive, an audio input-output unit, and various interfaces.

In the CD-ROM 241, printer driver in which a print data generating program and an image processing program are incorporated and information regarding settings and data to be used for executing the program are stored. Such printer driver and the information are stored (copied) from the CD-ROM 241 in a program storing area 251 (see FIG. 5) and a program-related information storing area 252 (see FIG. 5) in the HDD 250, at the time of installation. It should be noted that such information as the printer driver for the personal computer 200 and the other information can be obtained in the other method than obtaining from the CD-ROM 241. For example, other recording media such as a flexible disk and an MO (magnet-optical) disk are also available. Further, the information may be obtained from a terminal on a same network by connecting the personal computer 200 to the network.

As shown in FIG. 4, the RAM 230 is provided with several areas including an input image data storing area 231 for temporarily storing image data 310 (see FIG. 6), on which image data is based for generating the print data, an input background information image data storing area 232 for temporarily storing background information image data 350 (see FIG. 6), wherein a process to be applied to a pixel configuring the image data 310 is specified, a converted CMYKW data storing area 233 for storing converted CMYKW data 320 (see FIG. 6), which is converted from the image data 310, a print data storing area 234 for storing print data 330 (see FIG. 6), which is generated from the converted CMYKW data 320, and a runtime information storing area 235 for storing temporary the other data to be used during execution of other programs.

As shown in FIG. 5, the HDD 250 is provided with several areas including a program storing area 251 for storing various programs to be executed in the personal computer 200 including the printer driver (i.e., the print data generating program and the image processing program), a program-related information storing area 252 for storing information regarding settings, initial values, and data necessary for executing programs, a color conversion table storing area 253 for storing a color conversion table 410 (see FIG. 6), which is for converting the image data 310 into a color ink level (in a CMYK format), a white conversion table storing area 254 for storing a white conversion table 420 (see FIG. 6), which is for converting the image data 310 into a white ink level (in a W format), a specific color table storing area 255 for storing a specific color conversion table 430 (see FIG. 6), which is for converting the color information of the pixels in the image data 310 into specific color information specified by the user, an image data storing area 256 for storing a plurality of pieces of image data, and a background information image data storing area 257 for storing a plurality of pieces of background information image data.

In the present embodiment, a color conversion table 410 and a white conversion table 420, which are defined based on a feature of the recording medium by a supplier including a manufacturer and a designer of the inkjet printer, are provided. Similarly, in the specific color table storing area 255, an optimal specific color conversion table 430 prepared arbitrarily by the user or the supplier is stored. In the image data storing area 256 and the background information image data storing area 257, the plurality of pieces of image data and the plurality of pieces of the background information image data are respectively corresponded on one-to-one basis.

With the aforementioned configuration of the inkjet printer 1 according to the embodiment, as the print data transmitted from the personal computer 200 is received, the user sets a T-shirt on the platen 5 and presses the print button 182. Accordingly, the platen 5 is moved to rearward of the chassis 2 along the rails 3 by the platen driving motor 7 so that the position of the carriage 20 with respect to the platen 5 corresponds to a recording start position. Thereafter, the inkjet heads 21 eject the inks as the carriage 20 is moved from the right-hand side to the left-hand side of the chassis 2 according to a recording instruction so that recording of one line is executed. Further, the platen 5 is moved to frontward from the rearward of the chassis 2 for an amount corresponding to one line, and the inkjet heads 21 eject the inks as the carriage 20 is moved from the right-hand side to the left-hand side of the chassis 2 according to the recording instruction so that recording of the next line is executed. Subsequently, the platen 5 is moved to frontward from the rearward of the chassis 2 for the amount corresponding to another one line portion. By repeating this operation, printing the image onto the T-shirt is executed. At the end of the printing operation, the platen 5 is fed forth to a position wherein the T-shirt can be removed, thus the user removes the T-shirt which underwent the printing operation.

Hereinafter, color reproduction in the personal computer 200 and the inkjet printer 1 will be described. When a color in an area is displayed on the monitor 271 in the personal computer 200, the color of pixels configuring the area is represented in a format called sRGB format. The sRGB is an international standard of color space established by the IEC (International Electrotechnical Commission), and various PC peripherals including digital cameras, printers, and monitors perform color adjustment according to the sRGB to minimize a color difference between the inputted color and output color.

When an image is printed in a printing apparatus such as the inkjet printer 1 by ejecting the inks, a color is reproduced in a format called CMYK format, which is a method of representing colors by using four colors, which are the three primary colors (cyan, magenta, and yellow) and black, and the color is reproduced by a combination of the four values that are C value, M value, Y value, and K value. In order to print the print data represented in this format, inks in the four colors are used in the inkjet printer 1 wherein an ejecting amount of the cyan ink is determined by the C value, an ejecting amount of the magenta ink is determined by the M value, an ejecting amount of the yellow ink is determined by the Y value, and an ejecting amount of the black ink is determined by the K value.

In addition to the four inks, in the present embodiment, even when a base color of the recording medium such as a T-shirt is other than white (e.g. black and blue), in order to suitably print an image in higher reproducibility on a material surface of the recording medium, white ink is used. In this regard, an ejecting amount of the white ink is determined by a W value. Specifically, the color is reproduced in five values of the print data that are the C value, the M value, the Y value, the K value, and the W value, and image printing is executed by using the inks in these five colors.

Thus, in order to print the image based on the image data being displayed on the monitor 271 of the personal computer 200 by the inkjet printer 1, it is required to convert the image data in the sRGB format into print data in the CMYKW format. According to the present embodiment, upon executing a print data generation process (FIG. 16) by the personal computer 200, the print data in the CMYKW format is created based on the image data in sRGB format.

Figure 6:
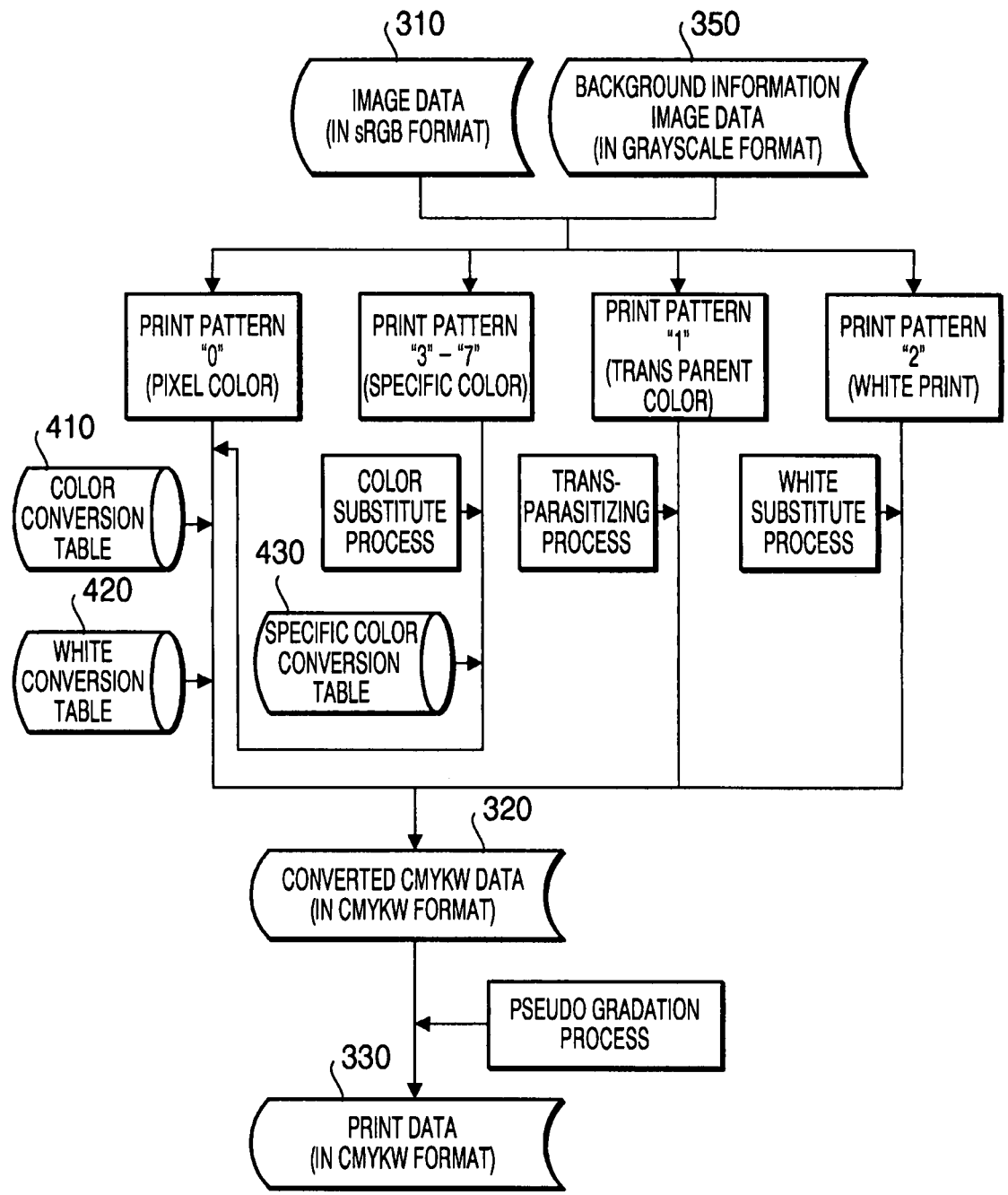
FIG. 6 shows transition of data in a print data generation process according to the embodiment of the invention.
Figures 9, 10:
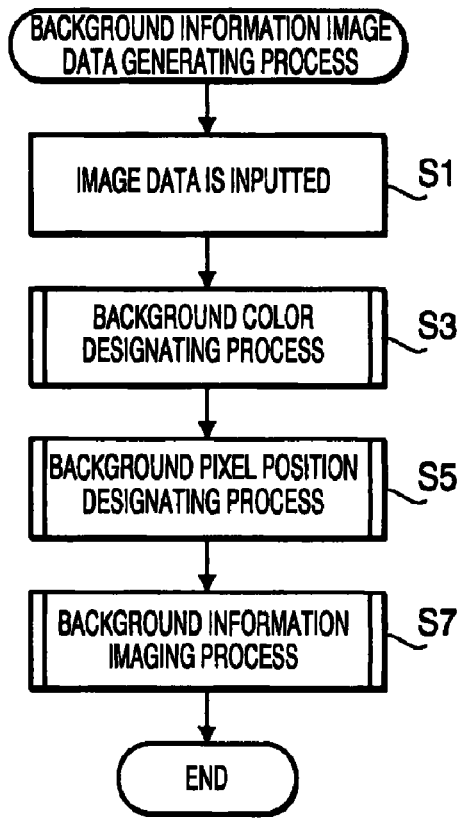
FIG. 9 shows a data configuration of a specific color conversion table 430 according to the embodiment of the invention.
FIG. 10 is a flowchart of a background information image data generating process in according to the embodiment of the invention.

Hereinafter, the data to be generated in the print data generation process according to the present embodiment will be described. FIG. 6 shows transition of data in the print data generation process according to the embodiment of the invention. FIG. 7 shows a data configuration of the color conversion table 410 according to the embodiment of the invention. FIG. 8 shows a data configuration of the white conversion table 420 according to the embodiment of the invention. FIG. 9 shows a data configuration of the specific color conversion table 430. In the present embodiment, the recording medium to be printed an image thereon is a T-shirt with a ground color of blue.

As shown in FIG. 6, basic data to create print data 330 is the image data 310 stored in the input image data storing area 231 in the RAM 230. The image data 310 is the data which is specified to be printed by the user among a plurality of pieces of image data which have been created by the user using various applications such as an application designed for creating documents and an application designed for editing graphics. Thus, the image data 310 is saved in the image data storing area 255 of the HDD 250. Specifically, the image data according to the present embodiment is represented in 256 color scale of the image data in sRGB format.

When the print data 330 is generated, the background information image data 350 stored in the input background 232 of the RAM 230 is used as well. The background information image data 350 is generated in a background image data generating process (see FIG. 10), which will be described hereinafter. The background information image data 350 is generated to correspond on pixel-to-pixel basis to the image data 310 which is to be printed among the plurality of pieces of background information image data stored in the background information image data storing area 257 of the HDD 250.

The background information image data 350 is a piece of image data having an equivalent number of pixels to a number of pixels included in the image data 310 to be printed and is represented in an eight stepped gray-scale format in which each pixel includes a data area for three bits of information. In the present embodiment, each of the pixels included in the image data 310 is assigned one of print patterns to be used for printing in the inkjet printer 1. In the data area for three bits of information, one of values that ranges from 0 to 7 is included to indicate one of the print patterns. The values ranging from 0 to 7 indicate the following print patterns respectively.

That is, a value 0 indicates "printing in a color of the pixel", in which color information of the pixel remains unchanged when the pixel is printed. A value 1 indicates "printing in a transparent color", in which no color is applied to the pixel when the pixels is printed. A value 2 indicates "printing in white", in which the pixel is printed in white. A value 3 indicates "printing in a specific color 1", in which the pixels is printed in a first specific color. Similarly, values 4, 5, 6 and 7 indicate "printing in a specific color 2", "printing in a specific color 3", "printing in a specific color 4", and "printing in a specific color 5", in which the pixel is printed in a second specific color, a third specific color, a fourth specific color, and a fifth specific color respectively.

In the present embodiment, a regular pixel, which does not have color information corresponding to a background color specified by the user and is not in a background position, is assigned the value 0, while a background pixel, which is a pixel having color information corresponding to the background color and being in the background position, is assigned one of the values 1 through 7. Thus, in the background information image data 350, the data area of the regular pixel is assigned "0" as the print pattern, while the data area of the background pixel is assigned one of "1" through "7" as the print pattern.

As shown in FIG. 6, a regular color conversion process is executed to the pixel having "0" in its data area so that the pixel is printed in the color indicated in the image data 310.

As the image data 310 is processed, the color ink level data in the CMYK format is created in a process such that the sRGB values of the pixel are respectively converted into the CMYK values based on the color conversion table 410, which is stored in the color conversion table storing area 253 of the HDD 250. The color conversion table 410 is a table for converting the input data in 256 color scale in the sRGB format into the output data in 256 color scale in the CMYK format. As shown in FIG. 7, each of the CMYK values is defined to correspond to each of the sRGB values respectively. Further, the sRGB values of the pixel are converted into the corresponding CMYK values respectively based on the color conversion table 410. In this regard, in the color conversion table 410, a profile wherein correspondence between the CMYK values and the sRGB values are defined may be arbitrarily created based on a known conversion method.

Also, the white ink level data in W format is created in a process such that the sRGB values of the pixel are converted into the W values respectively based on the white conversion table 420 stored in the white conversion table storing area 254 of the HDD 250. The white conversion table 420 is a table for converting the input data in 256 color scale in the sRGB format into the output data in 256 color scale in W format. As shown in FIG. 8, the W value is defined to correspond to each of the sRGB values respectively. Further, the sRGB values of the pixel are converted into the corresponding W value respectively based on the white conversion table 420. In this regard, in the white conversion table 420, a profile wherein correspondence between the sRGB values and the W values are defined may be arbitrarily created based on a known conversion method.

Meanwhile, it should be noted that the pixel in the background information image data 350 having one of the values ranging from "1" to "7" is the background pixel. Therefore, the sRGB values of the pixel as the background pixel are converted into the CMYK values respectively according to the print pattern designated by the user.

When the data area of the background pixel is assigned "1", which indicates "printing in a transparent color", no printing is performed to the pixel. Specifically, a transparentizing process, wherein the sRGB values of the pixel are converted into CMYKW values (0, 0, 0, 0, 0), is performed. It should be noted that when the CMYKW values for a pixel are (0, 0, 0, 0), no printing is performed for the pixel.

When the data area of the background pixel is assigned "2", which indicates "printing in white", the pixel is printed in white. Specifically, the sRGB values of the pixel are converted into CMYKW values (0, 0, 0, 0, 255), as a white substitute process, wherein the sRGB values of the pixel are substituted into CMYKW values (0, 0, 0, 0, 255), is performed. It should be noted that when the CMWK W values for a pixel are (0, 0, 0, 0, 255), the pixel is printed in white.

When the data area of the background pixel is assigned one of "3" through "7", which indicates "printing in a specific color" the pixel is printed in a specific color designated by the user. Specifically, a color substitute process, wherein the sRGB values of the pixel are substituted into sRGB values of the specific color designated by the user, is performed. Thereafter, the substituted sRGB values are converted into the CMYKW values based on the color conversion table 410 and the white conversion table 420 in the previously mentioned manner.

In the present embodiment, when the data area is assigned one of the values "3" through "7", and the sRGB values of the specific color designated by the user are (255, 255, 255), color conversion is executed in accordance with the color substitute process, although a result of the process is equivalent to a result of the white substitute process.

As shown in FIG. 9, in the specific color conversion table 430, sRGB values of the pixel is converted into sRGB values of the specific color, and sRGB values of a pixel are defined to correspond to sRGB values of the specific colors 1 through 5 respectively. Therefore, the sRGB values of the pixel are converted into sRGB values of one of the specific colors 1 through 5 according to the specific color conversion table 430. The specific color conversion table 430 may be created by the user or the supplier by defining correspondence between the print pattern of the pixel and the sRGB values of the pixel.

Thus, the sRGB values of the pixel are converted into the CMYKW values respectively based on the color conversion table 410 and the white conversion table 420. On the other hand, the background pixel in the image data 310 are converted respectively into any of the CMYKW values to execute no printing, and the CMYKW values to execute white printing, and CMYK W values to execute printing in the specific color according to the print pattern arbitrarily designated by the user. Thereafter, the converted CMYKW data 320 in 256 color scale in the CMYKW format is stored in the converted CMYKW data storing area 233 of the RAM 230. Additionally, a pseudo gradation process is performed on the converted CMYKW data 320 so that the print data 330 in two-color scale in the CMYKW format is created and stored in the print data storing area 234 in the RAM 230. Lastly, the print data 330 is transmitted to the inkjet printer 1 so as to be used for the image printing on the T-shirt as a recording medium.

Figure 11:
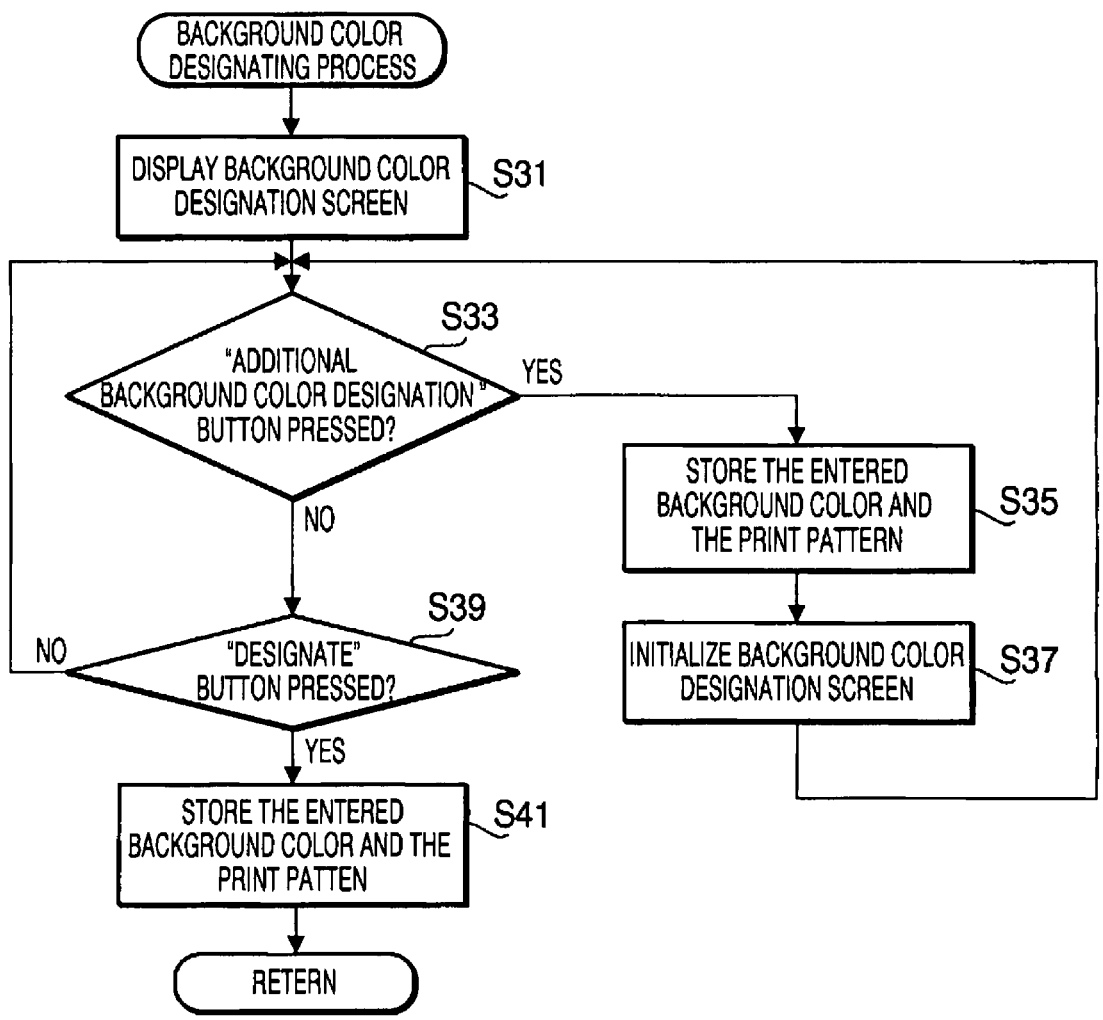
FIG. 11 is a flowchart of a background color designating process in detail according to the embodiment of the invention.
Figure 12:
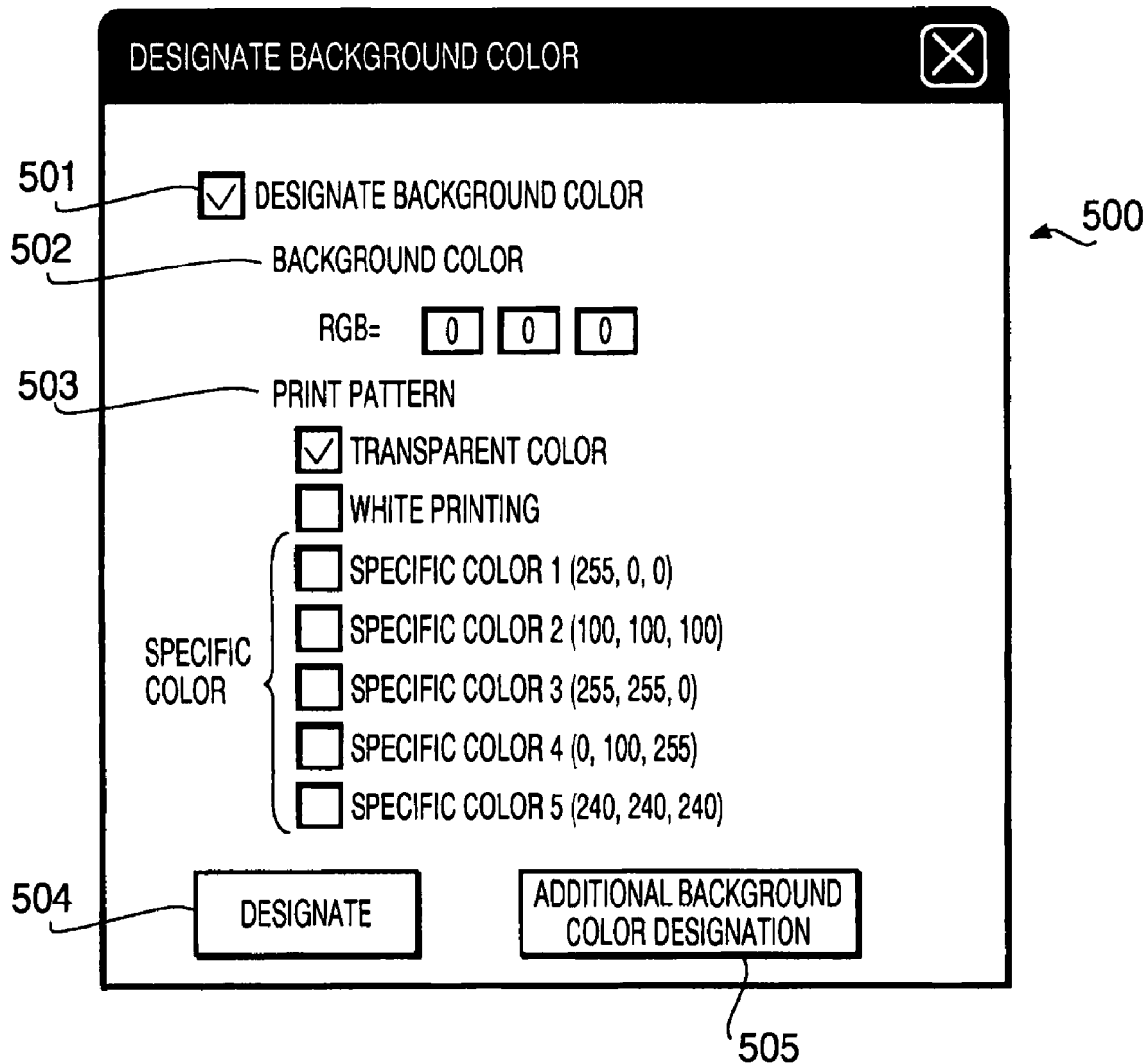
FIG. 12 shows an illustrative embodiment of a background color designating screen 500 according to the embodiment of the invention.
Figure 13:
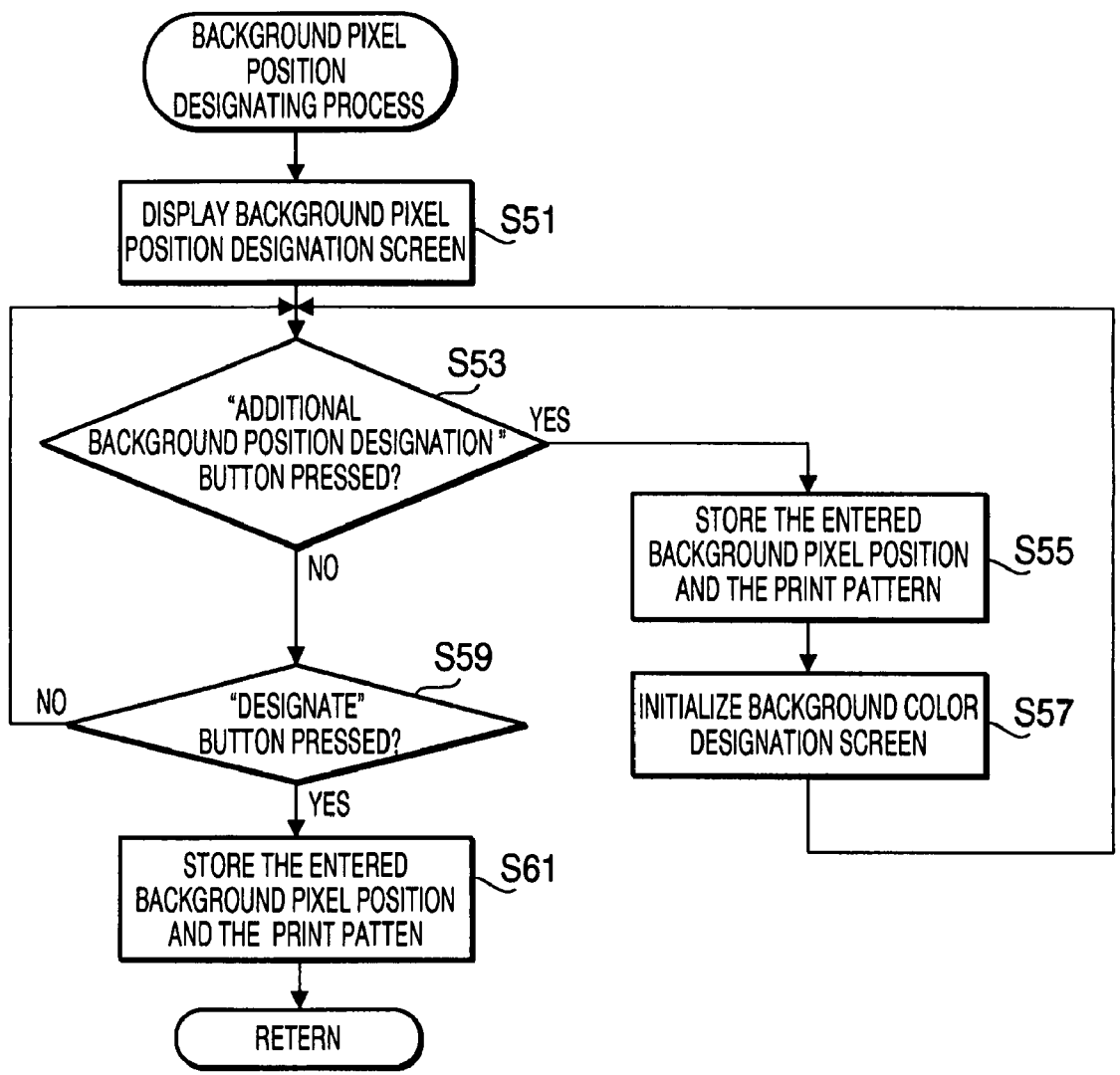
FIG. 13 is a flowchart of a background pixel position designating process in detail according to the embodiment of the invention.
Figure 14:
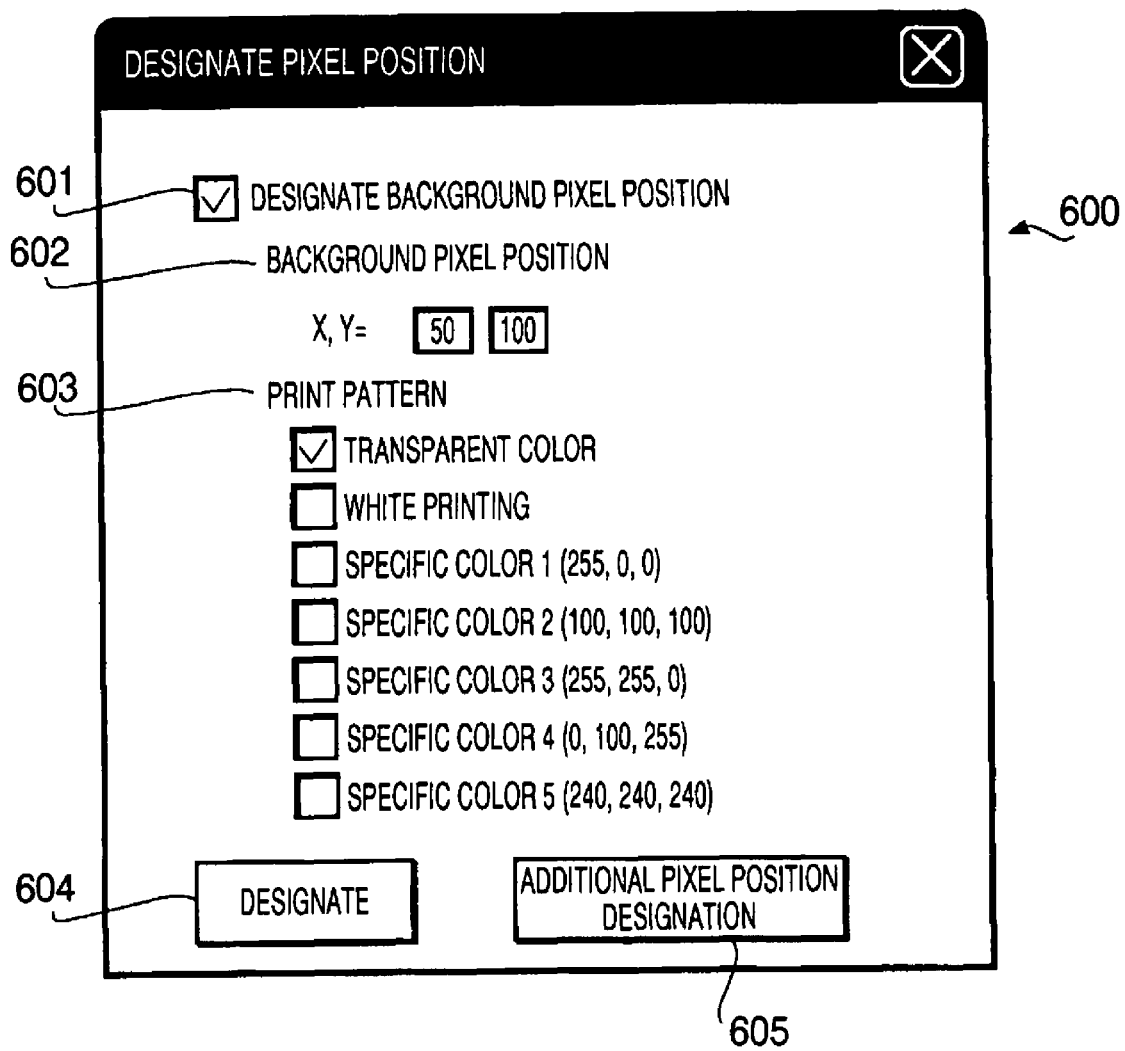
FIG. 14 shows an illustrative embodiment of a background pixel position designating screen 600 according to the embodiment of the invention.
Figure 15:
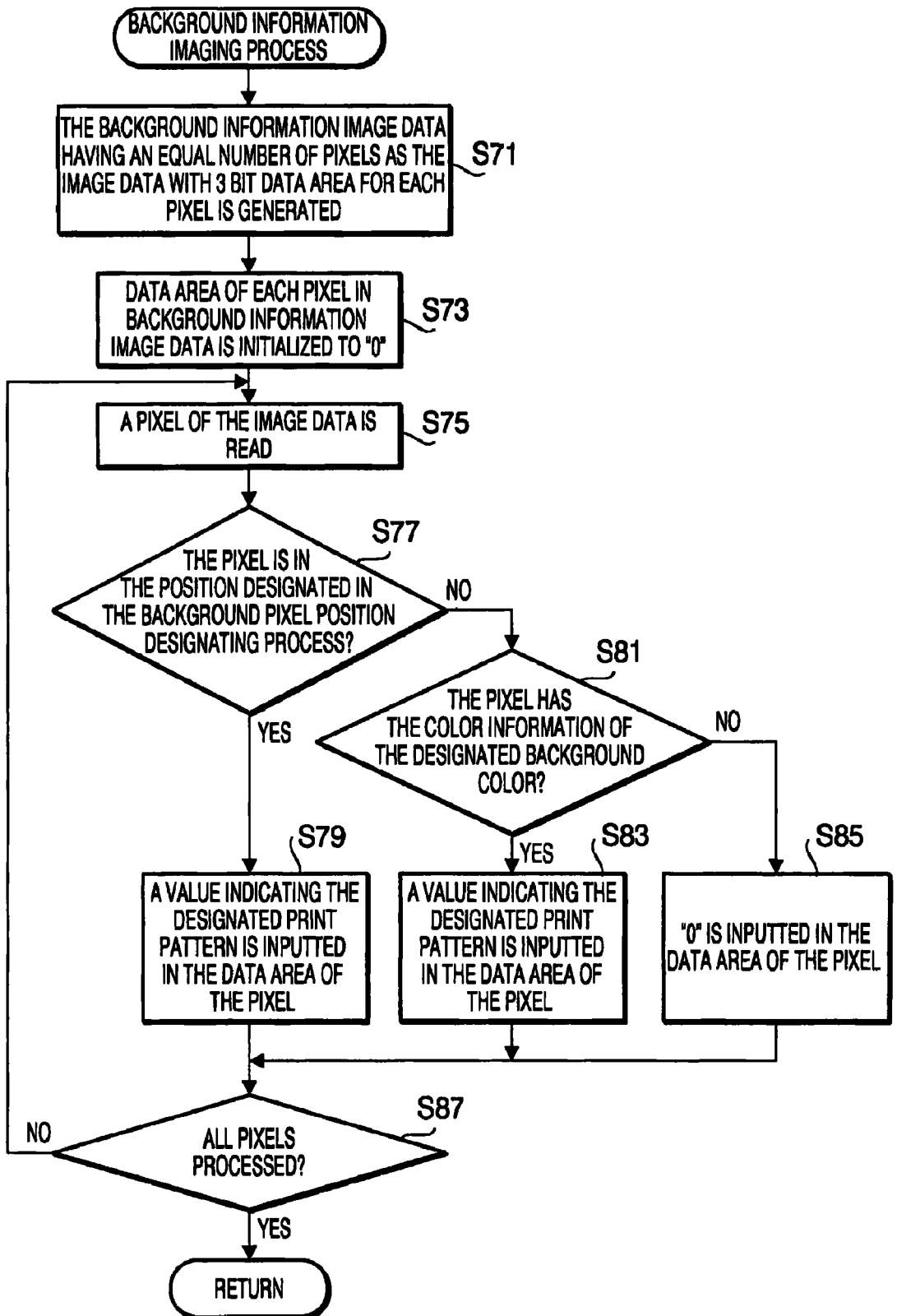
FIG. 15 is a flowchart of a background information imaging process according to the embodiment of the invention.

Hereinafter, a background information image data generating process will be described. FIG. 10 is a flowchart of the background information image data generating process in according to the embodiment of the invention. FIG. 11 is a flowchart of a background color designating process (S3) in detail according to the embodiment of the invention. FIG. 12 shows an illustrative embodiment of a background color designating screen 500 according to the embodiment of the invention. FIG. 13 is a flowchart of a background pixel position designating process (S5) in detail according to the embodiment of the invention. FIG. 14 shows an illustrative embodiment of a background pixel position designating screen 600 according to the embodiment of the invention. FIG. 15 is a flowchart of a background information imaging process (S7) according to the embodiment of the invention.

According to the present embodiment, when the user instructs to generate the background information image data, the printer driver is activated. And the background information image data generating process is executed by the CPU 210 based on an image processing program incorporated in the printer driver. The background information image data generating process can be executed in an arbitrary timing by the user. Further, the background information image data generating process can be executed in an arbitrary computer which is other than the personal computer 200. According to the present process, arbitrary background information image data corresponding to arbitrary image data can be generated. In the present embodiment, background information image data 350 corresponding to the image data 310, which is used in the print data generating process (see FIG. 16) will be explained as an example.

As shown in FIG. 10, as the background information image data generating process starts, the image data 310 is inputted (S1). In S1, the image data 310 specified by the user among a plurality of pieces of image data stored in the image data storing area 256 is read into a predetermined storing area of the RAM 230. When the user inputs an instruction to generate the background information image data 350, the background color designating process is executed (S3). In the background color designating process, a color as a background and a print pattern therefor is specified. In this regard, a criterion to determine the background pixel among a plurality of pixels in the image data 310 is specified as the user designates a background color in the image represented by the image data 310. Further, the print pattern of the background pixel is designated by the user.

As shown in FIG. 11, in the background color designating process according to the present embodiment, first, a background color designating process, wherein the user arbitrarily sets the background color and the print pattern for the background pixel, is executed (S3).

As shown in FIG. 12, as the background color designating process is started, first, a background color designation screen 500, which is a dialog window for the user to set the background color and the print pattern for the background pixel, is displayed on the monitor 271 (S31).

As shown in FIG. 12, the background color designation screen 500 is provided with a background color designation instruction checkbox 501 for issuing an instruction of designation of the background color, background color designation fields 502, each of which corresponds to an R value, a G value, and a B value, for designating an arbitrary background color, print pattern for background color checkboxes 503 for selecting of the process for the background color arbitrarily designated in the background color designation fields 502, a designate button 504 for terminating the background color designating process, and an "additional background color designation" button 505 for designating an additional background color. In the background color designation screen 500 displayed in S31, the user may input and designate one or more background colors and processes for the background colors by using the keyboard 281 and the mouse 282.

With the above configuration in the present embodiment, the user can designate a background color to be converted arbitrarily by entering sRGB values in 256 color scale in the background color designation fields 502. Among the print pattern for background color checkboxes 503, the user can select one of the seven patterns of "transparent color", "white printing", and "print in specific color 1" through "print in specific color 5". In the present embodiment, as shown in FIG. 12, the background color to be converted is designated by the sRGB values (0, 0, 0), and "transparent color" is designated to be applied the process for background.

Returning to FIG. 11, when the user presses the "additional background color designation" button 505 in the background color designation screen 500 (S33: YES), the background color (i.e., the sRGB values) entered in the background color designation fields 502 and the print pattern checked in the print pattern for background color checkboxes 503 are stored in the background color setting memory area (not shown) in the RAM 230 (S35). Then, the contents inputted in the background color designation screen 500 is cleared and the screen is initialized (S37), and the process returns to S33. With this configuration, the user can set an additional background color and the print pattern for the background color in the initialized background color designation screen 500.

When the user presses the designate button 504 in the background color designation screen 500 (S33: NO, S39: YES), similarly to S35, the background color entered in the background color designation fields 502 and the print pattern for the background color entered in the print pattern for background color checkboxes 503 are stored in the background color setting memory area in the RAM 230 (S41), and the process returns to the print data generation process (FIG. 10). In S33 and S39, if neither the designate button 504 nor the "additional background color designation" button 505 is pressed (S33: NO, S39: NO), the process returns to S33, and waits for a next entry from the user.

Returning to FIG. 10, the background pixel position designating process is executed (S5). In this process, a position of a pixel in the image data 310 to be specified as a background pixel and a print pattern for the background pixel are arbitrarily designated by the user.

As shown in FIG. 13, as the background pixel position designating process is started, first, a background pixel position designation screen 600, which is a dialog window for the user to set the position of a pixel as a background pixel and the print pattern for the background pixel, is displayed on the monitor 271 (S51).

As shown in FIG. 14, the background pixel position designation screen 600 is provided with a background pixel position designation instruction checkbox 601 for issuing an instruction of designation of the position of the background pixel, background pixel position designation fields 602, each of which corresponds to an X value and a Y value in an X-Y coordinate for designating an arbitrary position of the background pixel, print pattern for background pixel checkboxes 603 for selecting of the print pattern for the background pixel arbitrarily designated in the background pixel position designation fields 602, a designate button 604 for terminating the background pixel position designating process, and an "additional background pixel position designation" button 605 for designating an additional position of a background pixel. In the background pixel position designation screen 600 displayed in S51, the user may input and designate one or more positions of the background pixels and patterns for the background pixels by using the keyboard 281 and the mouse 282.

With the above configuration in the present embodiment, the user can designate a position of the background pixel to be converted arbitrarily by entering the X and the Y values in the XY coordinate in the background pixel position designation fields 602. Among the print pattern for background pixel checkboxes 603, the user can select one of the seven patterns of "transparent color", "white printing", and "print in specific color 1" through "print in specific color 5" similarly to the background color designation screen 500. In the present embodiment, as shown in FIG. 14, the position of the background pixel to be converted is designated by the XY coordinate (50, 100), and "transparent color" is designated to be applied the process for the background pixel.

Returning to FIG. 13, when the user presses the "additional background pixel position designation" button 605 in the background pixel position designation screen 600 (S53: YES), the position of the background pixel (i.e., the XY coordinate) entered in the background pixel position designation fields 602 and the print pattern checked in the print pattern for background pixel checkboxes 603 are stored in the background pixel position setting memory area (not shown) in the RAM 230 (S55). Then, the contents inputted in the background pixel position designation screen 600 is cleared and the screen is initialized (S57), and the process returns to S53. With this configuration, the user can set an additional position of the background pixel and the print pattern for the background pixel in the initialized background pixel position designation screen 600.

When the user presses the designating button 604 in the background pixel position designation screen 600 (S53: NO, S59: YES), similarly to S55, the position of the background pixel entered in the background pixel position designation fields 602 and the print pattern for the background pixel entered in the print pattern for background pixel checkboxes 603 are stored in the background pixel position setting memory area in the RAM 230 (S61), and the process returns to the print data generation process (FIG. 10). In S53 and S59, if neither the designating button 604 nor the "additional background pixel position designation" button 605 is pressed (S53: NO, S59: NO), the process returns to S53, and waits for a next entry from the user.

Returning to FIG. 10, finally, the background information imaging process is executed (S7). In this process, as shown in FIG. 15, the background information image data 350 is generated based on the background color and the print pattern for color designated in S3 and the position of the background pixel and the print pattern for the pixel designated in S5 (S71).

The background information image data 350 is a piece of image data having an equivalent number of pixels to a number of pixels included in the image data 310 to be printed and is represented in the eight stepped gray-scale format in which each pixel includes a data area for three bits of information. In the background information image data 350, the pixels are respectively corresponded to the pixels included in the image data 310 on one-to-one basis. As the background information image data 350 is generated (S71), the data area of each pixel therein is initialized to "0" (S73). Next, a first pixel of the image data 310 inputted in S1 is read (S75).

Next, it is judged as to whether the pixel read in S75 is in the position designated in the background pixel position designating process in S5 (S77). In S77, if one or more XY coordinates stored in the background pixel position setting memory area and the XY coordinate of the pixel match, it is determined that the pixel corresponds to be the background pixel (S77: YES). Thereafter, according to the print pattern designated in the background pixel position designating process in S5, a data area of a pixel in the background information image data 350 that corresponds to the pixel determined to be the background pixel in S77 is inputted a value indicating the print pattern designated in the background pixel position designating process in S5 (S79).

For example, as shown in the background pixel position designating screen 600 in FIG. 14, the user designates the XY coordinate (50, 100) as a position of a pixel to be the background pixel, and "transparent color" is designated as the print pattern. Therefore, if the position of the pixel is in (50, 100) in the XY coordinate, the data area for the three bits of the pixel in the background information image data 350 that corresponds to the pixel of the image data 310 is set to have "1". It should be noted that, when the user designates "white printing" as the print pattern, a value "2" is set in the data area. Similarly, when the user designates "print in specific color 1" through "print in specific color 5", values "3" through "7" are respectively set in the data area.

In S77, if the pixel read in S75 is not in the position designated in the background pixel position designating process in S5, it is judged as to whether color information of the pixel corresponds to the color information of the background color designated in the background color designating process in S3 (S81). In S81, if the sRGB values stored in the background color setting memory area in the RAM 230 and the sRGB values of the pixel read in S75 match, it is determined that the pixel read in S75 is in the background color (S81: YES). Thereafter, according to the print pattern designated in the background color designating process in S3, a data area of a pixel in the background information image data 350 that corresponds to the pixel determined to be the background pixel in S81 is inputted a value indicating the print pattern designated in the background pixel position designating process in S3 (S83).

For example, as shown in the background color designating screen 500 in FIG. 12, the user designates the sRGB values (0, 0, 0) as color information of a pixel to be the background pixel, and "transparent color" is designated as the print pattern. Therefore, if the color information of the pixel is (0, 0, 0)

in the sRGB format, the data area for the three bits of the pixel in the background information image data 350 that corresponds to the pixel of the image data 310 is set to have "1". It should be noted that, when the user designates "white printing" as the print pattern, a value "2" is set in the data area. Similarly, when the user designates "print in specific color 1" through "print in specific color 5", values "3" through "7" are respectively set in the data area.

In S81, if the color information of the pixel read in S75 does not match the color information designated in the background color designating process in S3, it is determined that the pixel is a regular pixel to which neither the background color designating process nor the background pixel position designating process is applied. Therefore, the data area for the three bits of the pixel in the background information image data 350 that corresponds to the pixel of the image data 310 is set to have "0", which indicates "pixel color" as the print pattern (S85). The "pixel color" indicates that the pixel is printed with the color information thereof remaining unchanged.

Next, it is judged as to whether all the pixels which configure the image data 310 set in S1 (in other words, the pixels configuring the background information image data 350 generated in S71) are processed (S87). If not (S87: NO), the process returns to S75, wherein a next pixel in the image data 310 is read, and one of the values ranging from "0" through "7" is set in the data area of the pixel (S77-S85). In this manner, the steps from S77 to S85 are executed repeatedly until data conversion of all the pixels which configure the image data 310 are executed (S87: YES). Thereafter, the background information image data 350 generated in the background information image data generating process is stored in the background information image data storing area 257 of the HDD 250.

In the background information image data generating process described above, the background information image data 350, wherein each pixel configuring the image data 310 is provided with a value to indicate the print pattern (a color to be printed), is generated. Specifically, each of the pixels in the background information image data 350 is provided with one of the values from "1" to "7" according to the background pixel which is designated by the user as one of the pixel having the color information as the background color and the positional information as the background pixel while each of the pixels in the background information image data 350 which does not correspond to the background pixel of the image data 310 is provided with a value "0" as a regular pixel.

With this configuration, the user can arbitrarily set the print patterns to the pixels designated to be the background pixels. Therefore, different pint patterns can be applied to the pixels in the background information image data 350 even when the pixels are indicated in a same color in the image data 310, and the pixels can be printed according to the print patterns on a pixel basis and an area basis within the image. For example, a part of the pixels represented in "yellow" based on the image data 310 may be applied the print pattern of the transparent color, while another part of the pixels represented in the same yellow may be applied the print pattern of the specific color "blue".

Figure 16:
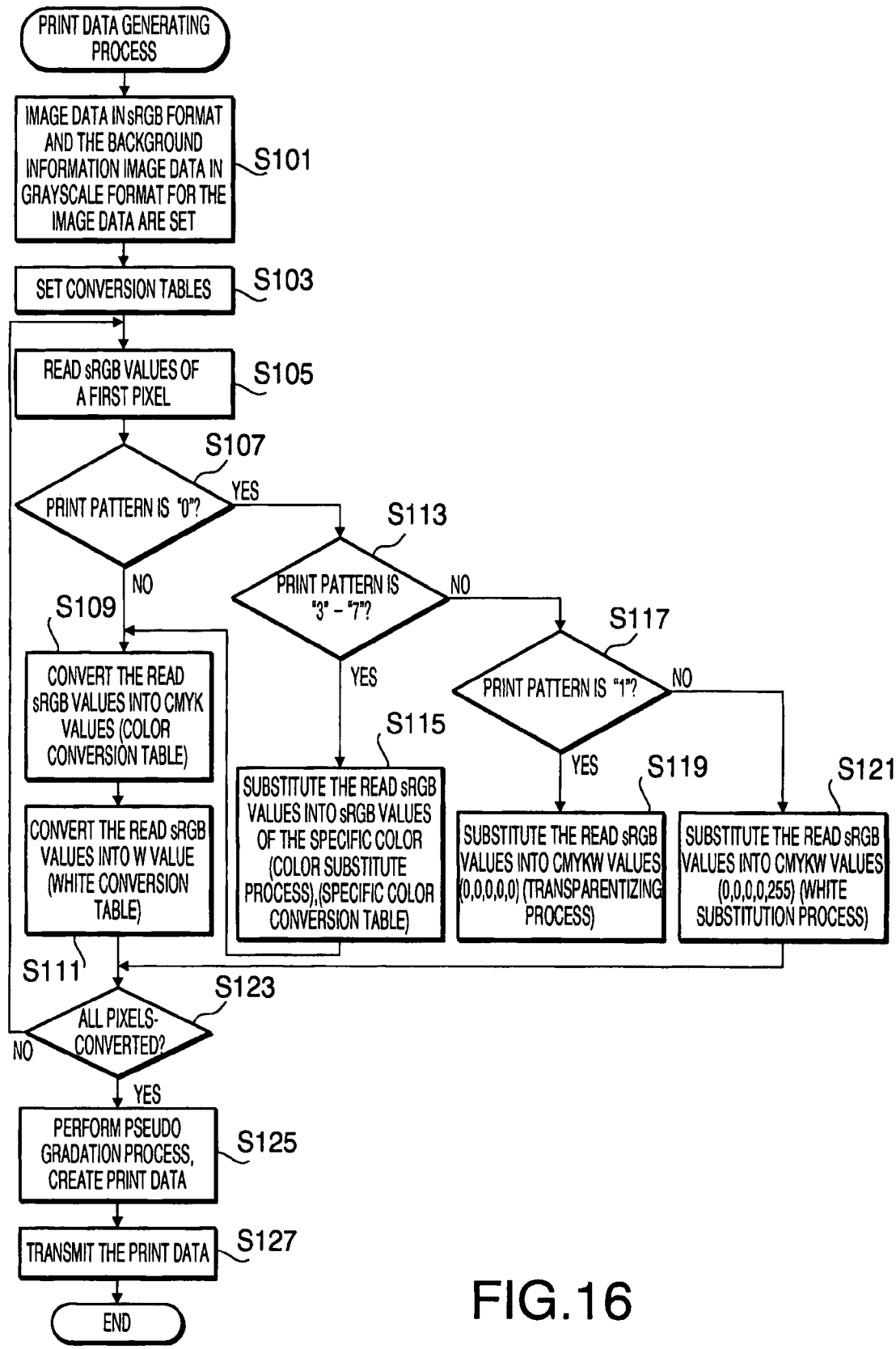
FIG. 16 is a flowchart of a print data generation process according to the embodiment of the invention.

Hereinafter, a print data generation process to be executed in the personal computer 200 for achieving the aforementioned data conversion by using the image data 310 and the background information image data 350 will be described. FIG. 16 is a flowchart of the print data generation process according to the embodiment of the invention. According to the present embodiment, when the user instructs to execute printing of the image data, the printer driver is activated. And the print data generation process is executed by the CPU 210 based on a print data creating program incorporated in the printer driver.

As shown in FIG. 16, when an instruction to execute printing the image data is given, the image data 310 to be printed is set. Further, the background information image data 350 corresponding to the image data 310 is set (S101). In S101, the image data 310 specified by the user among the plurality of pieces of image data stored in the input image data storing area 256 is read into the input image data storing area 231 of the RAM 230. Further, the background information image data 350 corresponding to the image data 310 among the plurality of pieces of background information image data stored in the background information image data storing area 257 is read into the input background information image data storing area 232 of the RAM 230.

Next, the color conversion table 410, the white conversion table 420, and the specific color conversion table 430 which are used for data conversion of the image data 310 are set (S103). In S103, according to the feature such as a color and a material of the recording medium specified by the user, an optimal color conversion table 410 is read from the color conversion table storing area 253, and an optimal white conversion table 420 is read from the white conversion table storing area 254. Further, a specific color conversion table 430 which has been specified in advance by the user is read from the specific color table storing area 255. Alternatively, the color conversion table 410 and the white conversion table 420 which are set in S103 may be arbitrarily specified by the user with using the keyboard 281 and the mouse 282. Thereafter, the sRGB values for a first pixel which configures the image data 310 set in S3 are read (S105).

Next, it is judged as to whether the print pattern of the pixel read in S105 is "0" (S107). In S107, the judgment is made by referring to the background information image data 350 set in S101 and based on the information set to the pixel in the background information image data 350 corresponding to the pixel read in S105. If the print pattern of the pixel is "0" (S107: YES), the sRGB values of the pixel are converted into corresponding CMYK values based on the color conversion table 410 set in S103 (S109). Further, the sRGB values of the pixel is converted into a corresponding W value based on the white conversion table 420 set in S103 (S111).

For example, neither a background color nor a background pixel position is specified in the background color designating screen 500 and the background pixel position designating screen 600, a value "0" indicating the "pixel color", wherein the pixel is printed with the color information thereof remaining unchanged, is assigned to the data area of the pixel in the background information image data 350 corresponding to the pixel inputted in S105. If the sRGB values of the pixel inputted in S105 are (64, 192, 255), CMYK values (190, 21, 0, 0) are obtained according to the color conversion table 410 shown in FIG. 7, and a W value (251) is obtained according to the white conversion table 420 shown in FIG. 8. Thus, CMYKW values (190, 21, 0, 0, 251) are obtained and stored in a relevant pixel number section in the converted CMYKW data memory area 233.

In S107, if the print pattern for the pixel is indicated by any one of the values "3" through "7" (S107: YES), the sRGB values of the pixel inputted in S105 are replaced with sRGB values of the specific color specified by the user according to the specific color conversion table 430 set in S103 in the color substitute process (S115). Further, the sRGB values of the pixel substituted into the specific color in S115 are converted into the CMYKW values based on the color conversion table 410 and the white conversion table 420, similarly to the steps described above (S109-S111).

For example, if one of a background color and a background pixel position is specified in the background color designating screen 500 or the background pixel position designating screen 600, and "specific color 1" is specified as the print pattern, a value "3" is assigned to the data area of a pixel in the background information image data 350 corresponding to the pixel inputted in S105. Therefore, the sRGB values of the pixel inputted in S105 are replaced with the sRGB values (225, 0, 0) of the "specific color 1" based on the specific color conversion table 430. Next, CMYK values and a W value corresponding to the sRGB values (225, 0, 0) are obtained based on the color conversion table 410 and the white conversion table 420 and stored in the relevant pixel number section in the converted CMYKW data memory area 233. Similarly, if the print pattern for the pixel is any one of "specific color 2" through "specific color 4", the sRGB values of the pixel inputted in S105 are replaced with the sRGB values of the specific color based on the specific color conversion table 430 and converted into the CMYKW values based on the color conversion table 410 and the white conversion table 420.

If the print pattern for the pixel is indicated by a value "1" (S112: NO, S117: YES), the sRGB values of the pixel inputted in S105 are applied the transparentizing process and converted into CMYKW values wherein no printing is performed (S119). For example, if one of a background color and a background pixel position is specified in the background color designating screen 500 or the background pixel position designating screen 600, and "transparent color" is specified as the print pattern, a value "1" is assigned to the data area of a pixel in the background information image data 350 corresponding to the pixel inputted in S105. Therefore, the sRGB values of the pixel inputted in S105 are converted into CMYKW values (0, 0, 0, 0, 0) and stored in a relevant pixel number section in the converted CMYKW data memory area 233.

If the print pattern for the pixel is indicated by a value "2" (S117: NO), the sRGB values of the pixel inputted in S105 are applied the white substitute process and converted into CMYKW values wherein white printing is performed (S121). For example, if one of a background color and a background pixel position is specified in the background color designating screen 500 or the background pixel position designating screen 600, and "white printing" is specified as the print pattern, a value "2" is assigned to the data area of a pixel in the background information image data 350 corresponding to the pixel inputted in S105. Therefore, the sRGB values of the pixel inputted in S105 are converted into CMYKW values (0, 0, 0, 0, 255) and stored in a relevant pixel number section in the converted CMYKW data memory area 233.

In the present embodiment, when the data area is assigned a value indicating one of the specific colors, which are the values "3" through "7", and the sRGB values of the specific color designated by the user are (255, 255, 255), color conversion is executed to the sRGB values read in S1015 in accordance with the color substitute process, although a result of the process is equivalent to a result of the white substitute process. Thus, the converted CMYKW values (0, 0, 0, 0, 255) are stored in the relevant pixel number section in the converted CMYKW data memory area 233.

Next, it is judged as to whether all the pixels which configure the image data 310 set in S1 are converted (S123). If not (S123: NO), the process returns to S105, wherein the sRGB values for a next pixel are read, and the sRGB values of the pixel are converted into the CMYKW values (S107-S121). In this manner, the steps from S105 to S123 are executed repeatedly until data conversion of all the pixels which configure the image data 310 are executed. Thereafter, in the converted CMYKW data storing area 233, the converted CMYKW data 320 in 256 color scale in the CMYKW format is stored.

In S123, if all the pixels are converted (S123: YES), the converted CMYKW data 320 stored in the converted CMYKW data storing area 233 is converted into the print data 330 in two-color scale in the CMYKW format by a pseudo gradation process (S125). The pseudo gradation process is for binarizing the converted CMYKW data 320 in 256 color scale to down scaled print tone, and the pseudo gradation process is performed by an error diffusion method in the present embodiment. And the print data 330 created in S125 is stored in the print data storing area 234. Thereafter, the print data 330 stored in the print data storing area 234 is transmitted to the inkjet printer 1 (S127), and the process is terminated.

Meanwhile, in the inkjet printer 1 of the present embodiment, upon receiving the print data 330 transmitted from the personal computer 200, the print data 330 is stored in the received print data storing area (not shown) of the RAM 130. When the user presses the print button 182, the print data 330 is read in the in-printing data storing area (not shown), and image printing is executed on the T-shirt as a recording medium based on the print data 330.

In the present embodiment, the five the inkjet heads 21 are arranged in an order of cyan (C), magenta (M), yellow (Y), K (black), and W (white) in a direction from left to right (see FIG. 1). In a one-way printing in the printing operation, the inks are ejected in the order of W, K, Y, M, and C from left to right onto the fabric. Thus, the white ink is ejected onto the fabric ahead of the other four colors of inks (CMYK). Therefore, it may be configured such that a ground color of the fabric can be covered with the white ink before the image is formed by the colored inks (CMYK) so that the image can be printed in fine reproducibility even if the ground color of the fabric is in a color other than white.

As described above, in the print data generation process according to the present embodiment, when the image data 310 and the background information image data 350 are inputted, each of the pixels configuring the image data 310 is applied a different data process respectively according to the print pattern set to a pixel configuring the background information image data 350 corresponding to the pixel of the image data 310. Thus, as an image is printed according to the print data 330 in the inkjet printer 1, the background pixels can be printed on the recording medium in the desired print pattern designated by the user.

In this regard, the print pattern refers to designating a color to be used for printing the pixels in the image data 310, and the print data 330 is generated so that the printed appearance of the pixels can be different in accordance with the print pattern. In the present embodiment, each of the pixels in the background information image data 350 is provided with one of the values indicating "pixel color", "transparent color", "white printing", and "specific color 1" through "specific color 5", and a pattern to print the pixel varies depending on the indicated value.

Therefore, the pixels having the identical color information in the image data 310 can be printed in the different patterns partially in the image or on a pixel basis. For example, a part of the background pixels having the identical color information (e.g., yellow) in the image data 310 can be printed in the "transparent color" while the other part of the background pixels in the same yellow in the image data 310 can be printed in a different color, such as blue.

It should be noted that the inkjet printer 1 according to the present embodiment is a printing apparatus capable of printing in white ink in contrasting density based on the white ink level (i.e., a W value). Further, in case the image based on the image data 310 contains a white pixel, and the ground color of the recording medium is in a color other than white, the white pixel contained in the image may be processed by using the function of white printing of the inkjet printer 1, which is described hereinafter.

When the user does not designate white as the background color of the image, the sRGB values of the white pixel (255, 255, 255) are converted into the corresponding CMYKW values (0, 0, 0, 0, 255) based the color conversion based on the color conversion table 410 and the white conversion tables 420 (S109, S111), similarly to that the regular pixels having color information other than the background color are converted based on the color conversion table 410 and the white conversion table 420. Accordingly, as the image is printed by the inkjet printer 1 based on the print data 330, a white area in the image is printed in white. Therefore, the white area in the image is represented in the white ink, and thus, the image can be printed in fine reproducibility, even if the ground color of the recording medium is in a color other than white.

Further, when the user does not designate white as the background color of the image, the sRGB values of the white pixel (255, 255, 255) are converted into the corresponding CMYKW values (0, 0, 0, 0, 0) with transparent color based on the color conversion table 410 and the white conversion table 420 (S109, S111) similarly to that "transparent color" is designated to the pixel as the print pattern. Accordingly, as the image is printed by the inkjet printer 1 based on the print data 330, an area having pixels with color information of white in the image is not printed at all. Therefore, the white area in the image is not printed, thus usage amount of the white ink can be preferably adjusted when the ground color of the recording medium is white, and thus, the image can be achieved at high speed yet low cost.

Furthermore, when the user designates white as "specific color" (for example, white) for the print pattern, the sRGB values of the pixel are converted into the corresponding CMYKW values of white (0, 0, 0, 0, 255) according to the white conversion process, similarly to that "white printing" is designated to the pixel as the print pattern. Accordingly, based on the print data 330, the area having pixels with color information of white in the image is printed in white. Therefore, the background area in the image can represented in the white ink, and thus, the image can be printed in fine reproducibility with the background printed in white.

With the above configuration of the personal computer 200 according to the present embodiment, as the background information image data 350 in which a color to be printed is specified on each of the pixels configuring the image data is inputted, the sRGB values of the pixel in the image data 310 are converted into sRGB values to be printed based on the background information image data 350, and the print data 330 is generated based on the image data 310 with the converted sRGB values. Therefore, the user can designate the print pattern (a color to be used) of each pixel in the image data 310 arbitrarily. Further, the user can generate the print data 330 so that the image can be printed in the user's desired appearance on the recording medium.

In the data area of each pixel in the background information image data 350, a value indicating one of the print patterns which are the "pixel color", the "transparent color", and the "specific color". Therefore, as the print data 330 is generated, the pixels configuring the image data 310 can be printed in one of the desired print pattern.

It should be noted that when a pixel in the background information image data 350 corresponding to the pixel in the image data 310 is assigned "pixel color" as the print pattern, the color information of the pixel in the image data 310 can remain unchanged to be printed. When "transparent" as the print pattern is assigned to the pixel in the background information image data 350, the sRGB values of the corresponding pixel in the image data 310 are converted into the CMYKW values wherein no printing is performed, therefore, the pixel can be prevented from being printed. Further, when one of the "specific colors" is assigned to the pixel in the background information image data 350, the sRGB values of the corresponding pixel in the image data 310 are converted into the CMYKW values wherein the pixel is printed in the specified color, therefore, the pixel can be printed in the specific color specified by the user.

Furthermore, when one of the "specific colors" is assigned to the pixel in the background information image data 350, the sRGB values of the corresponding pixel of the image data 310 are converted into the sRGB values of the specific color based on the specific color conversion table 430, wherein each of the "specific colors" is defined to correspond to a pattern of RGB values. Therefore, with the specific color conversion table 430, the background information image data 350 is not required to include the pattern of RGB values which correspond to the specific colors respectively, and a volume of the background information image data 350 can be reduced. With the patterns of RGB values for the specific colors, the user can easily designate one of the specific colors, and the correspondence between the specific colors and the patterns of RGB values can be arbitrarily edited by the user.

Furthermore, the user can obtain the background information image data 350 wherein a color to be used for printing is specified on a pixel basis in the image data 310 by arbitrarily designating one of the background color and the background pixel position and the print pattern (i.e., a color to be used for printing) for the pixel.

Although examples of carrying out the invention have been described, those skilled in the art will appreciate that there are numerous variations and permutations of the inkjet printer that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the embodiment described above, the blue T-shirt is used as a recording medium, however, the present invention may be applied also to another recording medium such as recording paper and labels. Further, the ground color is not limited to blue, but different colors such as red and black as well as white are also available. Furthermore, the inkjet printer 1 may be replaced with another printing apparatus that records an image on a recording medium in the other recording methods, such as laser printing using toner.

According to the above embodiment, the print pattern for the background pixel (a pixel having color information designated by the user to be the background color and a pixel in a position designated by the user as the background pixel position) of the image data 310 is designated by the user arbitrarily. However, the print pattern can be arbitrarily applied to the pixels configuring the image data 310 other than the background pixel in the image data 310. In this regard, the user may designate an arbitrary color and a print pattern therefor in the background color setting process (S3, FIG. 11), and may designate an arbitrary position of the pixel and a print pattern therefor in the background pixel position designating process (S5, FIG. 13).

In background pixel position designating process in the above embodiment, it is judged as to whether the pixel previously read is in the position designated in the background pixel position designating process (S77). In S77, if one or more XY coordinates stored in the background pixel position setting memory area and the XY coordinate of the pixel match, it is determined that the pixel corresponds to be the background pixel. However, it may be determined that the pixel corresponds to be the background pixel when the XY coordinate of the pixel is substantially close to the XY coordinate stored in the background pixel position setting memory area.

Further, in the above embodiment, the user designates the background color and the specific color in the sRGB format in the background color designation screen 500 (FIG. 12) and in the background pixel position designating screen 600 (FIG. 14), however, these colors may be designated in the other color space format such as the CMYK format and the HSV format. Furthermore, in the background information image data generating process (FIG. 10), the user may execute one of the background color setting process and the background pixel position designating process (S5, FIG. 13) to generate the background information image data 350. In the background information imaging process (S7, FIG. 15), if the pixel inputted read in S75 coincides to have the color information as the "background color" and positioned in the "background pixel position", the print pattern for the "background pixel position" is given priority. However, the print pattern for the "background color" may be given the priority.

In the above embodiment, the user selects one print pattern arbitrarily among the three patterns of "transparent color", "white printing", and "specific color" by designating in the background color designation screen 500 and the background pixel position designating screen 600. However, other various print patterns may be applied to the pixel. For example, the user may designate a "pixel color", wherein the color of the pixels is printed unchanged by designating in the background color designation screen 500 and the background pixel position designating screen 600.

In the above embodiment, each of the pixels in the background information image data 350 is provided with an data area of three bits, therefore, eight print patterns for the pixel in the image data 310 are available. However, the volume of the data area may be arbitrarily increased and reduced by the user and the supplier so that the print patterns can be arbitrarily increased and reduced. For example, when 16 print patterns for the specific colors are desired, the data area of each pixel in the background information image data can be provided with four bits.

In the embodiment described above, the color conversion table 410 and the white conversion table 420 are used for converting image data in the sRGB format into print data in the CMYKW format, however, different data formats may be arbitrarily selected. For example, the image data may be data on the other color space such as the CMYK format and the HSV format, and the print data may be data in the other color space such the RGB format and the HSV format depending on the recording method of the printer being used. In addition, the color conversion table 410 and the white conversion table 420 may be modified as long as correspondence of data format is defined so that the image data and the print data are convertible.

In the embodiment described above, five patterns of sRGB values for five specific colors are defined in the specific color conversion table 430. However, the specific color conversion table 430 may be modified in various ways. For example, the number of patterns of the sRGB values may be increased to ten or reduced to three. For another example, the color information may be defined in the other color format such as the CMYK format. The correspondence between the specific colors and the color information patterns may be also arbitrarily modified.

What is claimed is:

1. A print data generating apparatus to generate print data which is used for printing in a printing apparatus based on image data representing an image to be printed on a recording medium, comprising:
   a data inputting system by which application color setting data is inputted in the print data generating apparatus, the application color setting data including:
   application colors to print each of pixels configuring the image data, the application colors being indicated on a pixel basis,
   a same number of pieces of data as a number of the pixels configuring the image data, and
   print patterns indicating how colors in the pixels configuring the image data are to be substituted,
   wherein each pixel is assigned one of the print patterns based on whether color information of the pixel corresponds to a background color and whether the pixel is in a background position;
   a color substituting system in which the color information of each of the pixels configuring the image data is substituted with color information of the application colors to print each of the pixels configuring the image data based on the application color setting data;
   a print data generating system in which print data to be used for printing is generated based on the image data wherein the color information of each of the pixels is substituted with the color information of the application colors in the color substituting system.

2. The print data generating apparatus according to claim 1, wherein the application color setting data is assigned an application color pattern, as the application color to print each of the pixels configuring the image data, among a plurality of application color patterns including: a pixel color, a transparent color, and a specific color.

3. The print data generating apparatus according to claim 2, wherein the color substituting system maintains the color information of a pixel when the pixel is assigned the pixel color as the application color pattern.

4. The print data generating apparatus according to claim 2, wherein the color substituting system substitutes the color information of a pixel configuring the image data with color information whereby no printing is executed when the pixel is assigned the transparent color as the application color pattern.

5. The print data generating apparatus according to claim 2, wherein the color substituting system substitutes the color information of a pixel with color information of a specific color when the pixel is assigned the specific color as the application color pattern.

6. The print data generating apparatus according to claim 5, wherein the specific color as the application pattern assigned to the application color setting data is one of a plurality of predetermined specific colors, which respectively correspond to different colors; and
   wherein the color substituting system substitutes the color information of the pixel configuring the image data with color information of one of the different colors as the specific color.

7. The print data generating apparatus according to claim 6, wherein the plurality of predetermined specific colors include white.

8. The print data generating apparatus according to claim 6, comprising a specific color table storing system, in which a specific color table is stored, wherein the specific color table defines correspondences between the predetermined specific colors and the different colors,
  wherein the color substituting system specifies color information of one of the different colors as the specific color and substitutes the color information of the pixel with the color information of the specified color information of the specific color when the application color setting data is assigned the specific color as the application color.

9. A non-transitory computer usable medium comprising computer readable instructions for controlling a computer to generate print data which is used for printing in a printing apparatus based on image data representing an image to be printed on a recording medium by executing steps of:
  inputting application color setting in a print data generating apparatus, the application color setting data including:
    application colors to print each of pixels configuring the image data, the application colors being indicated on a pixel basis,
    a same number of pieces of data as a number of the pixels configuring the image data, and
    print patterns indicating how colors in the pixels configuring the image data are to be substituted,
    wherein each pixel is assigned one of the print patterns based on whether color information of the pixel corresponds to a background color and whether the pixel is in a background position;
  substituting the color information of each of the pixels configuring the image data with color information of the application colors to print each of the pixels configuring the image data based on the application color setting data;
  generating print data to be used for printing based on the image data wherein the color information of each of the pixels is substituted with the color information of the application colors in the color substituting system.

10. An image processing apparatus capable of generating application color setting data, the image processing apparatus comprising;
  an image data inputting system by which the image data is inputted in the image processing apparatus;
  a background color designating system in which at least one background color of a pixel in a background area of the image to be printed is arbitrarily designated based on a feature of the recording medium;
  an application color designating system in which one application color pattern is designated among a plurality of application color patterns as an application color to print the at least one background color of the pixel, wherein the plurality of application color patterns includes a pixel color, a transparent color, and a specific color; and
  an application color setting data generating system in which application color setting data is generated based on the at least one background of the pixel designated in the background color designating system and the application color pattern designated in the application color designating system, wherein:
  the application color setting data includes:
    application colors to print each of pixels configuring image data of an image to be printed on a recording medium, the application colors being indicated on a pixel basis,
    a same number of pieces of data as a number of the pixels configuring the original image data, and
    print patterns indicating how colors in the pixels configuring the original image data are to be substituted,
    wherein each pixel is assigned one of the print patterns based on whether a color information corresponds to a background color and whether the pixel is in a background position.

11. An image processing apparatus capable of generating application color setting data, the image processing apparatus comprising;
  an image data inputting system by which the image data is inputted in the image processing apparatus;
  a background pixel position designating system in which at least one position of a pixel in a background area of the image to be printed is arbitrarily designated;
  an application color designating system in which one application color pattern is designated among a plurality of application color patterns as the application color to print the pixel in the background area in the at least one position, wherein the plurality of application color patterns includes a pixel color, a transparent color, and a specific color; and
  an application color setting data generating system in which the application color setting data is generated based on the position of the pixel in the background area in the at least one position designated in the background pixel position designating system and the application color pattern designated in the application color designating system, wherein:
  the application color setting data includes:
    application colors to print each of pixels configuring image data of an image to be printed on a recording medium, the application colors being indicated on a pixel basis,
    a same number of pieces of data as a number of the pixels configuring the original image data, and
    print patterns indicating how colors in the pixels configuring the original image data are to be substituted,
    wherein each pixel is assigned one of the print patterns based on whether a color information corresponds to a background color and whether the pixel is in a background position.

12. A non-transitory computer usable medium comprising computer readable instructions for controlling a computer to generate application color setting data, by executing steps of:
  inputting the image data in the computer;
  designating arbitrarily at least one background color of a pixel in a background area of the image to be printed based on a feature of the recording medium;
  designating one application color pattern among a plurality of application color patterns as the application color to print the at least one background color of the pixel, wherein the plurality of application color patterns includes a pixel color, a transparent color, and a specific color; and
  generating the application color setting data based on the at least one background of the pixel designated in the background color designating system and the application color pattern designated in the application color designating system, wherein:

the application color setting data includes:
application colors to print each of pixels configuring image data of an image to be printed on a recording medium, the application colors being indicated on a pixel basis,
a same number of pieces of data as a number of the pixels configuring the original image data, and
print patterns indicating how colors in the pixels configuring the original image data are to be substituted,
wherein each pixel is assigned one of the print patterns based on whether a color information corresponds to a background color and whether the pixel is in a background position.

13. A non-transitory computer usable medium comprising computer readable instructions for controlling a computer to generate application color setting data, by executing steps of:
inputting the image data in the computer;
designating arbitrarily at least one position of a pixel in a background area of the image to be printed;
designating one application color pattern among a plurality of application color patterns as the application color to print the pixel in the background area in the at least one position, wherein the plurality of application color patterns includes a pixel color, a transparent color, and a specific color; and
generating the application color setting data based on the position of the pixel in the background area in the at least one position designated in the background pixel position designating system and the application color pattern designated in the application color designating system, wherein:
the application color setting data includes:
application colors to print each of pixels configuring image data of an image to be printed on a recording medium, the application colors being indicated on a pixel basis,
a same number of pieces of data as a number of the pixels configuring the original image data, and
print patterns indicating how colors in the pixels configuring the original image data are to be substituted,
wherein each pixel is assigned one of the print patterns based on whether a color information corresponds to a background color and whether the pixel is in a background position.

14. A print data generating apparatus to generate print data which is used for printing in a printing apparatus based on original image data representing an image to be printed on a recording medium, comprising:
a data inputting system by which application color setting data is inputted in the print data generating apparatus;
an application information specifying system, in which at least one of color information and positional information of one of the pixels configuring the original image data and a pattern to print the pixel are specified;
an application information data generating system, wherein application information data that includes information indicating the pattern to print the one of the pixels configuring the original image data is generated; and
a print data generating system, in which the print data to be used for printing each of the pixels configuring the original image data is generated based on the image data and the application information data generated in the application information data generating system, wherein:
the application color setting data includes:
application colors to print each of pixels configuring the original image data, the application colors being indicated on a pixel basis,
a same number of pieces of data as a number of the pixels configuring the original image data, and
print patterns indicating how colors in the pixels configuring the original image data are to be substituted,
wherein each pixel is assigned one of the print patterns based on whether a color information corresponds to a background color and whether the pixel is in a background position.

15. The print data generating apparatus according to claim 1, wherein the print patterns indicate substituting the color in each pixel as one of: an unchanged color, a transparent color, a white color, and a specific color designated by a user.

16. The print data generating apparatus according to claim 9, wherein the print patterns indicate substituting the color in each pixel as one of an unchanged color, a transparent color, a white color, and a specific color designated by a user.

17. The print data generating apparatus according to claim 10, wherein the print patterns indicate substituting the color in each pixel as one of: an unchanged color, a transparent color, a white color, and a specific color designated by a user.

18. The print data generating apparatus according to claim 11, wherein the print patterns indicate substituting the color in each pixel as one of: an unchanged color, a transparent color, a white color, and a specific color designated by a user.

19. The print data generating apparatus according to claim 12, wherein the print patterns indicate substituting the color in each pixel as one of: an unchanged color, a transparent color, a white color, and a specific color designated by a user.

20. The print data generating apparatus according to claim 13, wherein the print patterns indicate substituting the color in each pixel as one of: an unchanged color, a transparent color, a white color, and a specific color designated by a user.

21. The print data generating apparatus according to claim 14, wherein the print patterns indicate substituting the color in each pixel as one of: an unchanged color, a transparent color, a white color, and a specific color designated by a user.

* * * * *